(12) United States Patent
Baweja et al.

(10) Patent No.: US 11,062,362 B2
(45) Date of Patent: Jul. 13, 2021

(54) GENERATING DYNAMIC COMMUNICATION THREADS BASED ON USER INTERACTION WITH SPONSORED DIGITAL CONTENT

(71) Applicant: Facebook, Inc., Menlo Park, CA (US)

(72) Inventors: Himanshu Baweja, Sunnyvale, CA (US); Aditya Gopal Bhandarkar, San Jose, CA (US); Edward Young Zhang, San Francisco, CA (US); Hao Lin, Fremont, CA (US); Dheeraj Kumar Singh, San Jose, CA (US); Chuan Wang, Fremont, CA (US); You Zhou, San Bruno, CA (US)

( * ) Notice: Subject to any disclaimer, the term of this patent is extended or adjusted under 35 U.S.C. 154(b) by 544 days.

(21) Appl. No.: 15/793,858

(22) Filed: Oct. 25, 2017

(65) Prior Publication Data
US 2019/0121912 A1  Apr. 25, 2019

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0271* (2013.01); *G06Q 30/0251* (2013.01); *G06Q 30/0267* (2013.01); *G06Q 30/0623* (2013.01); *G06Q 30/0643* (2013.01)

(58) Field of Classification Search
CPC .......... G06Q 30/0251; G06Q 30/0271; G06Q 30/0267; G06Q 30/0623; G06Q 20/4016
USPC ...................................... 705/14.73
See application file for complete search history.

(56) References Cited

U.S. PATENT DOCUMENTS

| | | | |
|---|---|---|---|
| 2014/0304157 A1* | 10/2014 | Bachenheimer | G06Q 10/107 705/44 |
| 2016/0283936 A1* | 9/2016 | Daniel | G06Q 20/382 |
| 2016/0307249 A1* | 10/2016 | Ku | G06Q 30/0613 |

* cited by examiner

*Primary Examiner* — Sun M Li
(74) *Attorney, Agent, or Firm* — Keller Jolley Preece

(57) ABSTRACT

The present disclosure is directed to systems and methods for providing dynamic communication threads in response to a detected interaction with a sponsored digital content item. For example, systems and method described herein detect a user interaction with a sponsored digital content item and generate a screened communication thread between the user and the sponsor that is not available to the sponsor. The screened communication thread serves as a reminder to the user of the sponsored digital content item. Systems and methods described herein convert the screened communication thread to an open communication thread based on user interaction with the screened communication thread (e.g., after the user submits a reply in the screened communication thread). Thus, systems and methods described herein protect the user's online privacy unless and until the user indicates a desire to interact with the sponsor.

20 Claims, 10 Drawing Sheets

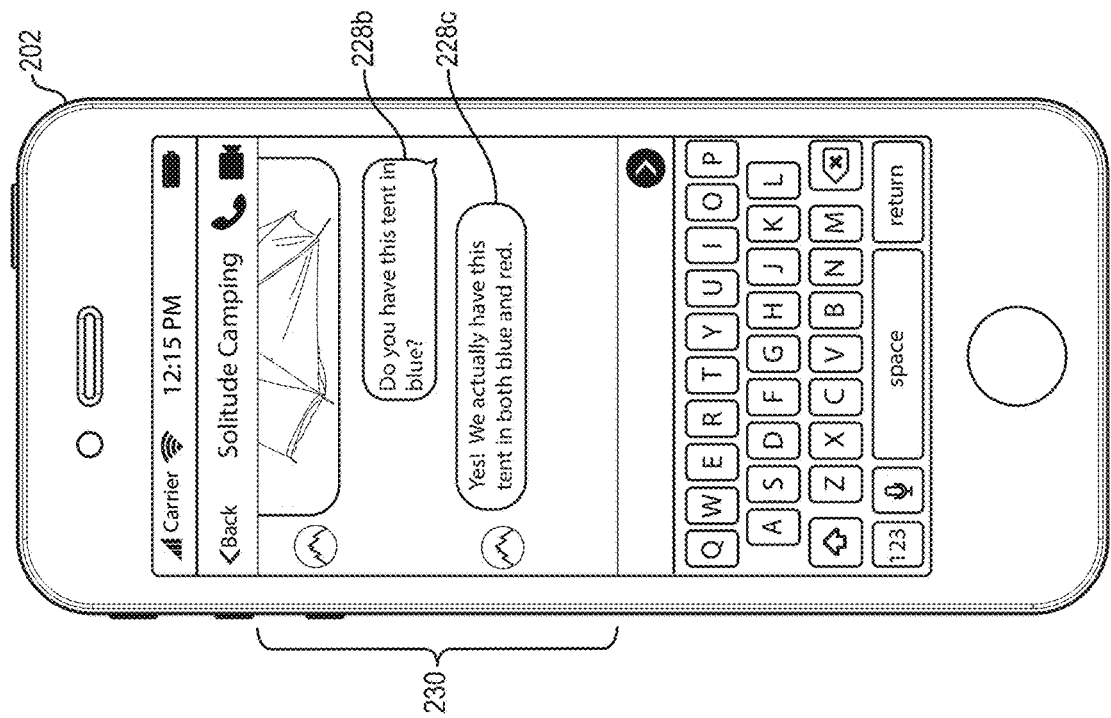

GENERATING DYNAMIC COMMUNICATION THREADS BASED ON USER INTERACTION WITH SPONSORED DIGITAL CONTENT

BACKGROUND

In recent years, individuals and businesses have increasingly utilized computer systems to access digital content from remote sources. Indeed, whether using personal computers, laptops, smartphones, or other client devices, users now routinely access a variety of digital content from remote servers, including news stories, advertisements, or digital entertainment content. For example, in the course of a few minutes, conventional computing systems can allow a user to interact with an array of sponsored digital content items such as clicking back and forth among articles, viewing advertisements, commenting on posts, and so forth.

Although conventional systems can quickly provide digital content to users from remote servers, such systems have a number of shortcomings. For example, conventional systems often fail to provide an effective mechanism for identifying and providing digital content that users have accessed previously. To illustrate, a user may interact with sponsored digital content (e.g., click on a sponsored link, watch a sponsored digital video, read a sponsored article, etc.) and continue browsing other material. At a later time, the user may wish to return to the sponsored digital content. Unfortunately, conventional systems generally fail to provide a mechanism for easily identifying and re-accessing the previously accessed content. This often leads to frustration for both the user and the sponsor of the digital content. For instance, the user may miss out on a potential opportunity to purchase a desired product, and the sponsor may miss out on a potential sale.

Some conventional systems seek to solve these problems by providing information regarding users directly to digital content sponsors. For example, when a user clicks on an article, conventional systems can provide personal information regarding the user to the sponsor of the article. Although this may allow a sponsor to identify users that interact with their sponsored digital content, it raises significant privacy concerns. Indeed, many users refuse to utilize systems that provide personal identifying information to third-parties, such as digital content sponsors. These and other problems exist with regard to conventional systems that provide sponsored digital content.

BRIEF SUMMARY

One or more embodiments described herein provide benefits and/or solve one or more of the foregoing or other problems in the art with systems and methods for generating dynamic communication threads based on user interaction with sponsored digital content. For example, in one or more embodiments, when a user interacts with a sponsored digital content item, the disclosed systems and methods generate a screened communication thread between the user and the sponsor. Specifically, the disclosed systems and methods can generate a screened communication thread between the sponsor and the user, where the screened communication thread is available to the user but not the sponsor. More particularly, in at least one embodiment, the systems and methods described herein generate a screened communication thread that includes an indicator of the sponsored digital content, thus providing the user with an active reminder of the sponsored digital content while also maintaining the user's privacy.

Although in one or more embodiments the screened communication thread is initially private (i.e., only available to the user), the disclosed systems and methods can also convert the screened communication thread to an open communication thread. Specifically, in one or more embodiments, the disclosed systems and methods can detect a user interaction with the screened communication thread, and then convert the screened communication thread to an open communication thread, available to both the user and the sponsor. For example, the disclosed systems and methods can detect user input, such as a message to the sponsor in the screened communication thread. In response, the disclosed systems and methods can convert the screened communication thread to an open communication thread, allowing the sponsor and the user to communicate directly.

By utilizing dynamic communication threads based on user interaction with sponsored digital content, the disclosed systems and methods can resolve many problems associated with conventional systems. Indeed, the disclosed systems and methods can quickly and easily track and provide sponsored digital content to users that the users have previously accessed. Moreover, the disclosed systems and methods can provide a screened communication thread that allows users to obtain additional information regarding sponsored digital content. Furthermore, the systems and methods described herein can provide this functionality while maintaining user privacy. Indeed, by providing a screened communication thread, the disclosed systems and methods can withhold personal information regarding a user until a user indicates a desire to communicate directly with the digital content sponsor.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which:

FIGS. 2A-2E illustrate a series of graphical user interfaces illustrating various features in accordance with one or more embodiments of the dynamic communication system;

DETAILED DESCRIPTION

Figure 1:
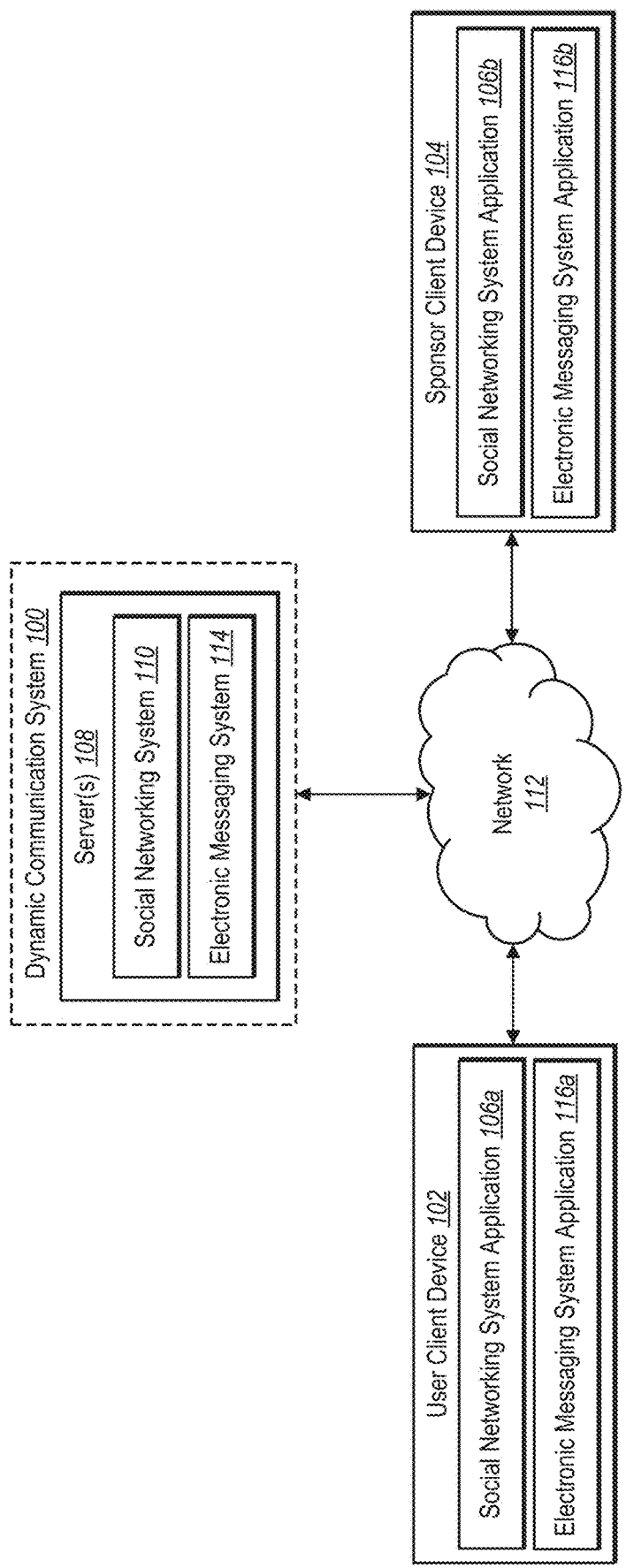
FIG. 1 illustrates an environmental diagram of a dynamic communication system in accordance with one or more embodiments.

One or more embodiments of the present disclosure include a dynamic communication system that generates dynamic communication threads based on user interaction with sponsored digital content. In particular, in one or more embodiments the dynamic communication system detects user interaction with a sponsored digital content item and generates a screened communication thread. Specifically, the dynamic communication system can generate a screened communication thread between a sponsor and user (e.g., that only the user can access) that includes the sponsored digital content items. In this manner, the dynamic communication system can provide information regarding the sponsored digital content to the user while maintaining user privacy.

Moreover, the dynamic communication system can also detect user interaction with the screened communication thread and convert the screened communication thread to an open communication thread available to both the user and the sponsor. Thus, based on user interaction with the screened communication thread, the dynamic communication system can generate an open communication thread allowing the user to directly interact with sponsors.

For example, the dynamic communication system can provide a sponsored digital content item within a feed of a social networking system. In response to the user interacting with the sponsored digital content item, the dynamic communication system can generate a screened communication thread that includes an indicator of the sponsored digital content item and is available only to the user. The dynamic communication system can then provide the screened communication thread to a user client device via an electronic communication system. In one or more embodiments, the dynamic communication system only converts the screened communication thread into an open communication thread in response to the user interacting with the screened communication thread. Further, in at least one embodiment, the dynamic communication system provides no identifying user information to the sponsor unless and until the user interacts with the screened communication thread, thus maintaining the user's online privacy.

By generating dynamic messages in response to user interaction with sponsored digital content, the dynamic communication system provides a number of advantages over conventional systems. For instance, the dynamic communication system improves Internet (or newsfeed) browsing by providing users with a seamless method for tracking and accessing sponsored digital content items with which the users interact. Specifically, the dynamic communication system provides a screened communication thread that includes an indicator of sponsored digital content that the user have previously accessed.

Moreover, by providing an indicator of sponsored digital content in a screened communication thread, the dynamic communication system allows users to easily obtain additional information regarding the sponsored digital content. For instance, a user can quickly and easily send a digital message to the sponsor via the screened communication thread to obtain information regarding the sponsored digital content.

Furthermore, the dynamic communication system provides this functionality while improving user privacy. Indeed, by generating a screened communication thread, the dynamic communication system can provide sponsored digital content to a user in a communication thread between the user and the sponsor while withholding identifying information about the user from the sponsor. Indeed, in one or more embodiments, the dynamic communication system only provides user information to a sponsor in response to the user indicating a desire to interact with the sponsor (e.g., by submitting a reply to the sponsor via the screened communication thread).

As just mentioned, in one or more embodiments, the dynamic communication system provides sponsored digital content and allows a user to interact with the sponsored digital content item via a social networking system. For example, the dynamic communications system can receive digital content items and targeting characteristics from a sponsor that indicate standards for providing the sponsored digital content item to users in a social networking system. For instance, the sponsor may specify that the digital content provider should only display the sponsored digital content item within the networking system to users who are 25-35 years old. Accordingly, in one or more embodiments, the dynamic communication system displays the sponsored digital content item to a particular user because the user matches the targeting characteristics specified by the sponsor.

As mentioned above, the dynamic communication system can generate screened communication threads in response to user interaction with sponsored digital content items. The dynamic communication system can detect a variety of different user interactions with the sponsored digital content item. For example, the dynamic communication system can detect a user stopping a newsfeed scroll at a position corresponding to the sponsored digital content item, hovering a mouse over the sponsored digital content item, clicking a hyperlink associated with the sponsored digital content item, viewing a digital video (e.g., live or recorded) included in the sponsored digital content item, submitting a comment associated with the sponsored digital content item to a social networking system (or "liking" the sponsored digital content item), or sharing the sponsored digital content item via a social networking system.

In response to detecting user interaction with the sponsored digital content item, the dynamic communication system can also generate a screened communication thread between the user and the sponsor. For instance, in at least one embodiment, the dynamic communication system adds a first message to the screened communication thread that includes an indicator of the sponsored digital content item. For example, the dynamic communication system can include, within the first message, one or more of: a digital media item (e.g., a digital picture or video) from the sponsored digital content item, a hyperlink associated with the sponsored digital content item, descriptive text from the sponsored digital content item, metadata from the sponsored digital content item, or a digital video preview associated with the sponsored digital content item.

In at least one embodiment, the dynamic communication system generates and provides the screened communication thread based on the user's activity level relative to a particular messaging application. For example, the dynamic communication system can monitor and analyze the user's interactions with one or more messaging applications and select a messaging application for the screened communication thread based on the user's interactions. To illustrate, the dynamic communication system can analyze the user's interactions to determine which messaging application the user most frequently utilizes and then provide the screened communication thread via the messaging application the user most frequently utilizes. Additionally, the dynamic communication system can further analyze user interactions with the one or more messaging applications to determine whether (and/or how often) the user interacts with sponsors. The dynamic communication system can then provide the screened communication thread via a messaging application that the user is most likely to use to interact with the screened communication thread and/or sponsor.

As mentioned above, the dynamic communication system can generate a screened communication thread between a user and a sponsor, and make the screened communication thread available only to the user (e.g., withhold the screened communication thread from the sponsor). For example, in one or more embodiments, the dynamic communication system makes the screened communication thread available to the user via a dedicated messaging application, such that the screened communication thread appears (to the user) to have come from the sponsor. Although the screened communication thread appears to come from the sponsor, in one or more embodiments, the dynamic communication system does not make the screened communication thread available to the sponsor. Thus, in at least one embodiment, the sponsor is completely unaware of the screened communication thread.

In addition to generating the screened communication thread, the dynamic communication system can also manage other information corresponding to the user. For example, in one or more embodiments, the dynamic communication system does not provide any user information to the sponsor (e.g., until the user interacts with the screened communication thread). In other embodiments, the dynamic communication system withholds identifying information about the user from the sponsor (i.e., to protect the user's privacy) but provides other general information regarding the user's interactions (consistent with privacy settings of the user). For instance, the dynamic communication system can provide aggregated information to the sponsor regarding a number of users who have interacted with the sponsored digital content item, demographic information corresponding to users who have interacted with the sponsored content item, or a number of screened communication threads associated with the sponsored content item while withholding identifying information regarding the user (such as the user's name or contact information).

As mentioned above, the dynamic communication system can also detect user interaction with the screened communication thread. The dynamic communication can detect a variety of different user interactions relative to the screened communication thread. For example, in one or more embodiments, the dynamic communication system detects the user selecting the screened communication thread from a listing of communication threads in a messaging application. Furthermore, the dynamic communication system can detect a user selecting a message in the screened communication thread, composing an incomplete reply message within the screened communication thread, or sending a reply message to the sponsor via the screened communication thread.

In response to detecting user interaction with the screened communication thread, the dynamic communication system can provide information regarding the user to the sponsor. For example, in one or more embodiments, the dynamic communication system provides different information to the sponsor depending on the level of interaction between the user and the screened communication thread. For example, if the user opens the screened communication thread from a listing of communication threads in a messaging application, the dynamic communication system may provide the user's demographic information (e.g., gender, age, geographic location, etc.) to the sponsor. If the user begins to compose a message to the sponsor in the screened communication thread but does not send the composed message, the dynamic communication system may provide networking system activity information associated with the user (e.g., the user's purchase activities, the user's "likes," a number of other sponsors with whom the user has interacted, etc.).

Furthermore, as mentioned above, in one or more embodiments the dynamic communication system converts the screened communication thread to an open communication thread. In particular, in one or more embodiments, the dynamic communication system converts a screened communication thread to an open communication thread in response to detecting that the user has sent a reply to the sponsor via the screened communication thread. For example, the dynamic communication system can convert the screened communication thread (not available to the sponsor) to an open communication thread that is available to both the user and the sponsor. Thus, after the dynamic communication system converts the screened communication thread to the open communication thread, the sponsor can interact directly with the user by sending and receiving digital messages via the open communication thread.

If a user does not interact with a screened communication thread, the dynamic communication system can also provide "soft" reminders. For example, the dynamic communication system can send reminders to a user who has not interacted with a screened communication thread after a threshold period of time. To illustrate, in response to determining that a user has not interacted with a screened communication thread (e.g., replied to a message or selected a screened communication thread) within a week of generating a screened communication thread, the dynamic communication system can reposition the screened communication thread within a listing of communication threads in the user's messaging application (e.g., such that the screened communication thread is more prominently displayed). In another embodiment, the dynamic communication system adds another message to the screened communication thread (e.g., offering the user a coupon or other communication corresponding to the sponsored digital content item).

Thus, the dynamic communication system can allow users to access sponsored digital content that the user previously accessed and easily access additional information regarding the sponsored digital content, while maintaining user privacy until the user is ready to directly interact with the sponsor.

As used herein, a "sponsored digital content item" refers to a digital content item provided by a third-party. In particular, the term "sponsored digital content item" includes a digital content item provided by a third-party to a digital content provider for transmission to a client device. For example, in one or more embodiments, a digital content item includes one or more of a social networking system post, a hyperlink, a digital photograph, a digital video, a block of text, a structured digital item, a news article, or an advertisement. As mentioned, in at least one embodiment, the sponsor utilizes a digital content provider (e.g., a website, a search engine, or a networking system) to provide the sponsored digital content item to one or more users. To illustrate, a digital content provider can provide a digital content item as part of a social networking system newsfeed, a listing of search results, the displayed framework of a web page, or a popup window. Furthermore, in some embodiments, the sponsor specifies target characteristics (e.g., desired user demographics, locations, languages, or other features) representative of the users to whom the sponsored digital content item should be provided.

As used herein, a "sponsor" refers to a third-party who provides a sponsored digital content item. In particular, a sponsor includes a third-party that provides a sponsored digital content to a digital content provider for display to a user. For example, a sponsor may be a company, an individual, or a group that provides content to a digital content provider for display to a user that interacts with one or more systems of the digital content provider.

As used herein, a "screened communication thread" refers to one or more digital messages between a user and a sponsor, where the one or more digital messages are not available to the sponsor. In particular, a screened communication thread includes a thread of one or more instant messages or texts between a user and a sponsor that the sponsor cannot access. To illustrate, a screened communication thread includes a thread that comprises an instant message, where the instant message indicates the sponsor as the sender of the instant message and the user as the recipient of the instant message, even though the sponsor cannot access the instant message. For example, in one or more embodiments, in response to a user interacting with a sponsored digital content item, the dynamic communication system generates the screened communication thread between the user and the sponsor that includes an indicator of the sponsored digital content item. The dynamic communication system then adds the screened communication thread to a stack of communication threads only for the user and not for the sponsor. Thus, in one or more embodiments, the screened communication thread is only available to the user (i.e., only the user can draft a digital communication via the screened communication thread).

As used herein, an "open communication thread" refers to one or more digital messages between a user and a sponsor that is available to the user and the sponsor. In particular, an open communication thread includes a thread of one or more instant messages or texts between a user and a sponsor that the sponsor and the user can access. To illustrate, an open communication thread includes a thread that comprises an instant message, where the instant message indicates the sponsor as the sender of the instant message and the user as the recipient of the instant message, where the instant message is available to both the sender and the recipient. Thus, an open communication thread includes a communication thread that has been added to a stack of communication threads for a user and to a stack of communication threads for a sponsor. For example, as will be described in greater detail below, in response to a user sending a reply within a screened communication, the dynamic communications system can convert a screened communication thread to an open communication thread. Accordingly, in one or more embodiments, both the user and the sponsor are capable of sending and receiving messages in an open communication thread, while only the user may interact with a screened communication thread.

FIG. 1 illustrates an example block diagram of an environment for implementing a dynamic communication system 100. As illustrated in FIG. 1, the dynamic communication system 100 includes server(s) 108 which comprises a social networking system 110 and an electronic messaging system 114. Further shown in FIG. 1, the dynamic communication system 100 includes the user client device 102 and the sponsor client device 104. Both the user client device 102 and the sponsor client device 104 include the social networking system application 106a, 106b and an electronic messaging application 116a, 116b, respectively.

The server(s) 108, the user client device 102, and the sponsor client device 104 communicate via the network 112, which may include one or more networks and may use one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks.

Although FIG. 1 illustrates a particular arrangement of the user client device 102, the sponsor client device 104, and the server(s) 108, various additional arrangements are possible. For example, the user client device 102 may directly communicate with the server 108 and/or the sponsor client device 104, bypassing the network 112. Additional details relating to the network 112 are explained below with reference to FIG. 7.

Further, as shown in FIG. 1, the user client device 102 and the sponsor client device 104 includes the social networking system application 106a, 106b, respectively. In one or more embodiments, the social networking system application 106a, 106b is associated with the social networking system 110, and enables access to social networking system content (e.g., posts, newsfeeds, profiles, etc.). Moreover, in at least one embodiment, the social networking system application 106a interacts with a web browser associated with the user client device 102 such that the social networking system application 106a has access to the user's Internet activity history.

Additionally, as shown in FIG. 1, the user client device 102 and the sponsor client device include the electronic messaging system application 116a, 116b, respectively. For example, in at least one embodiment, the electronic messaging system application 116a, 116b organizes electronic messages exchanged between the users of the electronic messaging system 114 into communication threads, wherein each thread includes a chronological ordering of electronic messages, as well as additional indicators as to who authored an electronic message and whether the electronic message has been delivered and/or read. In yet further embodiments, the social networking system application 106a, 106b and the electronic messaging system application 116a, 116b are combined into a single dedicated networking system application. Similarly, in one or more embodiments, the social networking system 110 and the electronic messaging system 114 are combined into a single networking system (e.g., the networking system 702 described in FIG. 7).

As illustrated, in one or more embodiments, the server(s) 108 can include all, or a portion of, the dynamic communication system 100. In particular, the dynamic communication system 100 can comprise an application running on the server(s) 108 or a portion of a software application that can be downloaded from the server(s) 108. For example, the dynamic communication system 100 can include a web hosting application that allows the client device 102 (or multiple client devices) to interact with content hosted at the server(s) 108. To illustrate, in one or more embodiments of the dynamic communication system 100, the client device 102 can access a webpage supported by the server(s) 108. In particular, the client device 102 can run an application to allow a user to access, view, and/or interact with a webpage or website hosted at the server(s) 108.

Although FIG. 1 illustrates a particular arrangement of the client device 102, the network 112, and the server(s) 108, various additional arrangements are possible. For example, while FIG. 1 illustrates a single client devices 102 communicating with the server(s) 108 via the network 112, in one or more embodiments multiple client devices may communicate directly with the server(s) 108, bypassing the network 112.

Similarly, although FIG. 1 illustrates various components, the dynamic communication system 100 may have additional or alternative components. For example, the dynamic communication system 100 can be implemented on a single computing device. In particular, the dynamic communication system 100 may be implemented in whole by the client device 102 or the dynamic communication system 100 may be implemented in whole by the server(s) 108. Alternatively, the dynamic communication system 100 may be implemented across multiple devices or components (e.g., utilizing multiple client devices and the server(s) 108).

As discussed above, the systems and methods laid out with reference to FIG. 1 can detect user interaction with sponsored digital content items and generate a screened communication thread associated with each sponsored digital content item. By way of example, in one or more embodiments, the user client device 102 utilizes the social networking system application 106a to obtain and display a feed of posts from the social networking system 110. Furthermore, the server(s) 108 receive a sponsored digital content item from the sponsor client device 104 and provide the sponsored digital content item to the user client device 102 as part of the feed of posts from the social networking system 110. The user client device 102 can detect user interaction with the sponsored digital content item via the social networking system application 106a and provide the user interaction to the server(s) 108.

In response to the detected user interaction, the server(s) 108 can generate a screened communication thread that includes an indicator of the sponsored digital content item and provide the screened communication thread to the user client device 102 via the electronic messaging system application 116a. In particular, the servers(s) 108 can provide the screened communication thread to the user client device 102 while withholding the screened communication thread from the sponsor client device 104. Furthermore, the user client device 102 can detect user interaction with the screened communication thread via the electronic messaging application 116a and provide an indication of the detected user interaction to the server(s) 108. The server(s) 108 can then convert the screened communication thread to an open communication thread and provide the open communication thread to both the user client device 102 and the sponsor client device 104 via the electronic communication messaging applications 116a, 116b.

The dynamic communication system 100 can also provide, alone and/or in combination with other components, one or more graphical user interfaces ("GUIs") in performing its functions. For example, the dynamic communication system 100 can utilize the social networking system application 106a, 106b or the electronic communication application 116a, 116b to provide GUIs with interface elements that allow the user and the sponsor to interact with the dynamic communication system 100. To illustrate, FIGS. 2A-2E and the description that follows illustrate various example embodiments of GUIs and features in accordance with one or more embodiments of the dynamic communication system 100.

Figure 2B:
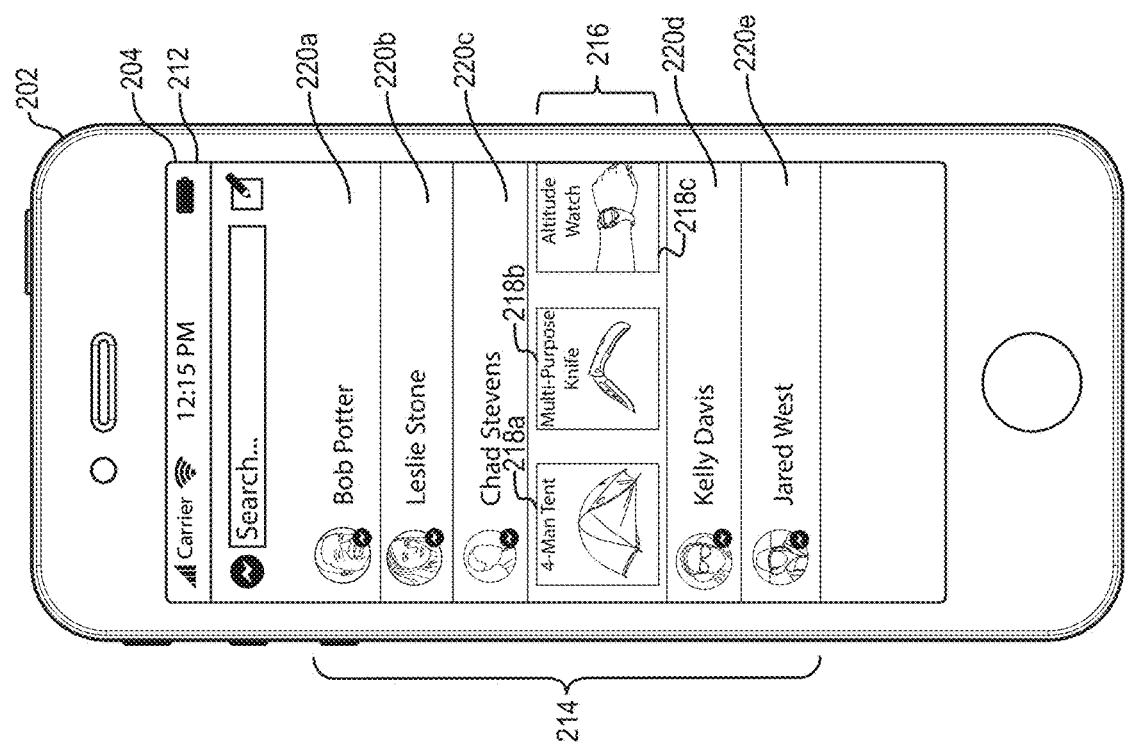
Figure 2A:
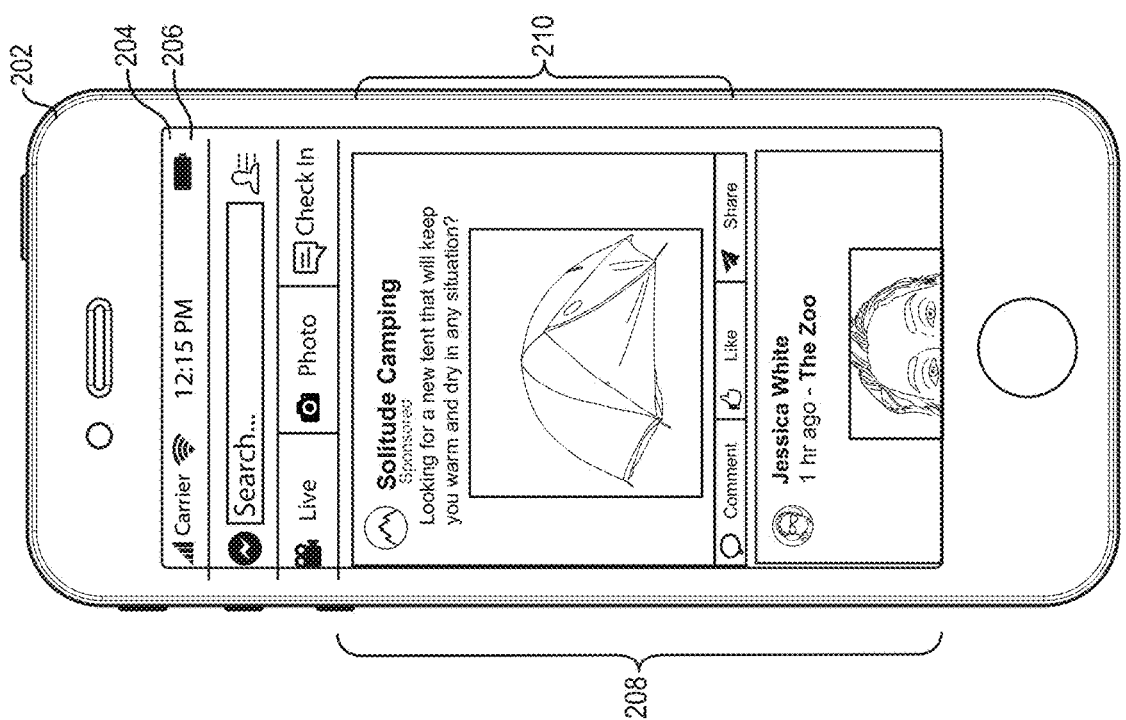

For example, FIG. 2A illustrates a client device 202 (e.g., the user client device 102, as shown in FIG. 1) that may implement one or more of the components or features of the dynamic communication system 100. As shown, the client device 202 is a handheld device, such as a mobile phone device (e.g., a smartphone). As used herein, the term "handheld device" refers to a device sized and configured to be held/operated in a single hand of a user. In additional or alternative examples, however, the client device 202 may be any other suitable computing device, such as, but not limited to, a tablet device, a larger wireless device, a laptop or desktop computer, a personal digital assistant device, a wearable computing device (e.g., a head-mounted computing device, etc.), and/or any other suitable computing device.

As illustrated in FIG. 2A, the client device 202 includes a touch screen display 204 that can display GUIs and receive and/or detect user input. As used herein, a "touch screen display" refers to the display of a touch screen device (e.g., the client device 202). In one or more embodiments, a touch screen device may be any computing device with at least one surface upon which a user may perform touch gestures (e.g., a laptop, a tablet computer, a personal digital assistant, a media player, a mobile phone, etc.). Additionally or alternatively, the client device 202 may include any other suitable input device, such as a touch pad or those described below with reference to FIG. 6.

In FIG. 2A, the touch screen display 204 displays a social networking system GUI 206 provided by the social networking system application 106a. As shown, the social networking system GUI 206 includes a newsfeed 208. In one or more embodiments, the user's social networking system newsfeed includes posts submitted by social networking system co-users associated with the user (e.g., the user's "friends"). Furthermore, as shown in FIG. 2A, the newsfeed 208 can include a sponsored digital content item 210. As mentioned above, in at least one embodiment, the dynamic communication system 100 displays the sponsored digital content item 210 in the newsfeed 208 of the user in response to determining that the user matches targeting characteristics previously specified by the sponsor.

As shown in FIG. 2A, the sponsored digital content item 210 is a social networking system post including structured data. For example, the sponsored digital content item 210 is made of structured data including text and a digital photograph, along with identifying information related to the sponsor. In other embodiments, a sponsored digital content item may include any combination of text, media, or metadata.

In one or more embodiments, in response to detecting a selection of any portion of the sponsored digital content item 210, the dynamic communication system 100 provides additional information corresponding to the sponsored digital content item 210. For example, the dynamic communication system 100 can display a web page associated with the sponsor (e.g., a web page displayed via the social networking system application 106a or a web browser associated with the client device 202). Similarly, in response to detecting a selection of any portion of the sponsored digital content item 210, the dynamic communication system 100 can transition the touch screen display 204 to another networking system GUI including further details related to the sponsored digital content item 210.

As mentioned above, there are a variety of ways in which the user of the client device 202 may interact with the sponsored digital content item 210. For example, in addition to detecting a selection of the sponsored digital content item 210, the dynamic communication system 100 can detect a pause as the user scrolls through the newsfeed 208 (e.g., wherein the sponsored digital content item 210 is displayed within the social networking system GUI 206 during the pause). Similarly, the dynamic communication system 100 can automatically begin playing a digital video corresponding to the sponsored digital content item 210 when the sponsored digital content item 210 appears in the newsfeed 208 and detect that a user watches the digital video based on the amount of time that the digital content item remains displayed in the newsfeed 208. In another example, the dynamic communication system 100 can detect social networking system activity associated with the sponsored digital content item 210 (e.g., a share, a comment, or a "like," of the sponsored digital content item 210). Additionally, in another example, the dynamic communication system 100 can access a front-facing camera associated with the client device 202 to determine the user's eye position and whether the user is looking at the digital content item 210 (e.g., for longer than a threshold amount of time).

In response to interaction between the user of the client device 202 and the sponsored digital content item 210, the dynamic communication system 100 generates and provides a screened communication thread. For example, in response to detecting the user interacting with the sponsored digital content item 210 displayed by the social networking system application 106a, the dynamic communication system 100 generates a screened communication thread between the user of the client device 202 and the sponsor associated with the sponsored digital content item 210. In at least one embodiment, the dynamic communication system 100 provides the generated screened communication thread within the electronic messaging system application 116a to a list of the user's existing communication threads in a dedicated electronic messaging system application (while withholding the screened communication thread from the sponsor associated with the sponsored digital content item 210). Accordingly, while FIG. 2A illustrates the networking system GUI 206 corresponding to the social networking system application 106a, FIGS. 2B-2E illustrate GUIs corresponding to the electronic messaging system application 116a.

For example, as shown in FIG. 2B, the dynamic communication system 100 can provide the messaging GUI 212 on the touch screen display 204 of the client device 202. In one or more embodiments, the messaging GUI 212 includes a communication thread list 214 including communication thread controls 220a, 220b, 220c, 220d, 220e associated with communication threads between the user of the client device 202 and other users. In at least one embodiment, in response to a detected selection of one of the communication thread controls 220a-220e, the dynamic communication system 100 displays a GUI showing the contents of the associated communication thread, as will be illustrated further below.

For example, as shown in FIG. 2B, upon generating the screened communication thread associated with the sponsored digital content item 210, the dynamic communication system 100 adds the sponsored communication thread control 218a to the messaging GUI 212. Specifically, in relation to the embodiment of FIG. 2B, the dynamic communication system 100 adds the sponsored communication thread control 218a to the sponsored communication thread list 216. As shown in FIG. 2B, in at least one embodiment, the sponsored communication thread list 216 may be a horizontally-scrollable list including other sponsored communication thread controls 218b and 218c.

Although FIG. 2B illustrates the sponsored communication thread control 218a in the sponsored communication thread list 216, the dynamic communication system can add the sponsored communication thread control 218 that is not within a sponsored communication thread list (e.g., similar to the communication thread controls 220a-220e). For example, in one or more embodiments, the dynamic communication system 100 can provide the communication thread controls 220a-220e and the sponsored communication thread controls 218a-218c in a single list where each control's position within the list is based on how recently the user interacted with the associated communication thread or when the associated communication thread was generated.

As shown in FIG. 2B, the dynamic communication system 100 includes an indicator of the sponsored digital content item 210 (e.g., as illustrated in FIG. 2A) in the communication thread control 218a. In particular, the dynamic communication system 100 includes an indicator that includes elements taken from the sponsored digital content item 210 in the sponsored communication thread control 218a (e.g., a digital image and product title). In one or more embodiments, the dynamic communication system 100 includes these elements (or other elements such as a sponsor logo or a title of the sponsored digital content item 210) as a reminder to the user of the client device 202 of the sponsored digital content item 210 with which the user previously interacted. For example, in additional or alternative embodiments, the dynamic communication system 100 may include an indication of the sponsored digital content item 210 by providing the sponsor's name in the sponsored communication thread control 218a. For example, the dynamic communication system 100 may only include the sponsor's name if the user has previously interacted with more than one sponsored digital content item from the same sponsor.

In one or more embodiments as mentioned above, the dynamic communication system 100 generates a screened communication thread by creating a communication thread between the user of the client device 202 and the sponsor associated with the sponsored digital content item 210, but not making the created communication thread available to the sponsor. Furthermore, in at least one embodiment, the dynamic communication system 100 further generates and provides a message to the screened communication thread in response to the detected interaction between the user of the client device 202 and the sponsored digital content item 210. Indeed, in response to a detected selection of any of the sponsored communication thread controls 218a-218c, the dynamic communication system 100 can display a GUI showing one or more messages included in the sponsored communication thread associated with the selected screened communication thread control. For example, as shown in FIG. 2C, the dynamic communication system 100 generates and adds the message 228a to the screened communication thread 224 displayed in the communication thread GUI 222 provided by the electronic messaging system application 116a. As further shown in FIG. 2C, the communication thread GUI 222 also includes a display screen keyboard 226, by way of which the user of the client device 202 may compose and send an electronic message to the sponsor.

As shown in FIG. 2C, the message 228a includes an indicator of the sponsored digital content item 210 with which the user previously interacted. In one or more embodiments, the dynamic communication system 100 includes part or all of the sponsored digital content item 210 in the message 228a in order to serve as a reminder to the user of the client device 202 of the sponsored digital content item 210 with which the user previously interacted. In at least one embodiment, the dynamic communication system 100 maintains, in the message 228a, interactive features included in the sponsored digital content item 210. For example, the dynamic communication system 100 can maintain a hyperlink, such that the user may click on the message 228a in order to open a web page (e.g., via a web browser or the social networking system application). Similarly, the dynamic communication system 100 can include media playback functionality such that the message 228a can auto-play all or a portion of a digital video, a digital photograph slideshow, etc. that was included in the sponsored digital content item 210.

As discussed above, in relation to the embodiment of FIG. 2C, the dynamic communication system 100 provides no user information to the sponsor when generating the screened communication thread. Instead, the dynamic communication system 100 provides varying levels of user information to the sponsor in response to detecting the user of the client device 202 interacting with the screened communication thread. For example, the dynamic communication system 100 detects user interactions including, but not limited to: a selection of the sponsored communication thread control 218a as shown in FIG. 2B, a selection of the message 228a as shown in FIG. 2C, typing via the display screen keyboard 226 (without sending any message), and sending a message via the communication thread GUI 222.

In response to each type of detected user interaction, the dynamic communication system 100 provides different levels of user information. For example, in response to detecting a selection of the sponsored communication thread control 218a or a selection of the message 228a, the dynamic communication system 100 can provide non-specific user information including, but not limited to, the user's gender, age, geographic location, time zone, and language. In response to detecting typing prior to the user sending a reply message, the dynamic communication system 100 can provide more specific user information including, but not limited to, the user's networking system activity history, the user's online purchase history, and the user's messaging activity history.

In at least one embodiment, in response to detecting a reply sent from the user via the screened communication thread 224 displayed in the communication thread GUI 222, the dynamic communication system 100 converts the screened communication thread to an open communication thread and provides the sponsor with additional user information. For example, in response to detecting a reply message from the user to the sponsor, the dynamic communication system 100 can provide the sponsor with the information listed above in addition to the user's networking system user name, contact information, or payment method information.

Once the dynamic communication system 100 converts the screened communication thread to an open communication thread (e.g., in response to the user submitting a reply to the sponsor via the screened communication thread), the sponsor is free to interact with the user via the open communication thread. For example, as shown in FIG. 2D, the user drafts and sends a reply message 228b to the sponsor. In response to detecting the user's reply via the message 228b, the dynamic communication system 100 converts the screened communication thread 224 to the open communication thread 230. The dynamic communication system 100 makes the open communication thread 230 available to the sponsor such that the sponsor can interact with the user of the client device 202.

Indeed, as shown in FIG. 2D, the dynamic communication system 100 provides the message 228b to the sponsor and receives a message 228c from the sponsor in response to the message 228b. Furthermore, the dynamic communication system 100 provides the message 228c for display to the user via the electronic messaging system application 116a installed on the client device 202.

As shown in the open communication thread 230, the user and the sponsor may utilize the open communication thread 230 to request and provide additional information regarding the sponsored digital content item 210 (e.g., clarify product details). In additional embodiments, the user and the sponsor may further utilize the open communication thread 230 to make and pay for purchases, cancel orders, make new orders, respond to questions, provide and/or redeem discounts and/or coupons, or monitor shipping details.

Figure 2E:
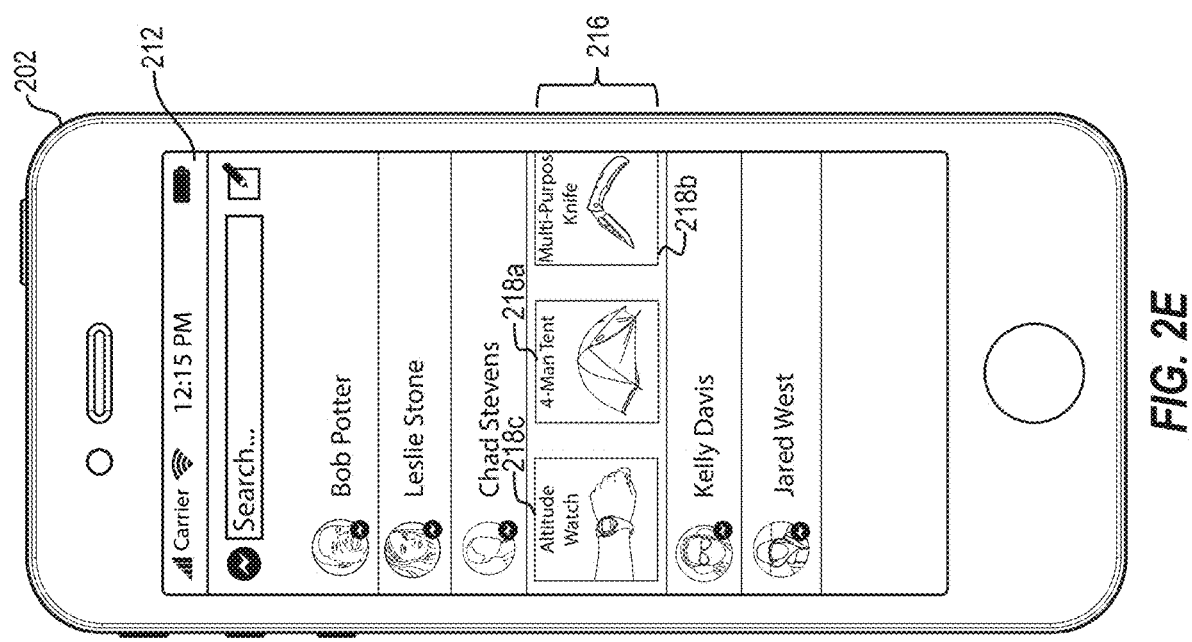

In one or more embodiments, the dynamic communication system 100 provides reminders associated with a screened communication thread. As used herein, a reminder refers to a digital notification. In particular, a reminder includes a digital notification that prompts a user to interact with a screened communication thread. For example, as illustrated in FIG. 2E, the dynamic communication system determines that the user of the client device 202 has not interacted with the screened communication thread represented by the sponsored communication thread control 218c after a threshold period of time (e.g., a week, 10 days, etc.). In response, the dynamic communication system 100 reorders the sponsored communication thread controls 218a-218c in the sponsored communication thread list 216. For instance, as shown in FIG. 2B, the sponsored communication thread control 218c was previously listed third in the sponsored communication thread list 216. In response to detecting a lack of user interaction with the screened communication thread control 218c for the threshold period of time, the dynamic communication system 100 reorders the sponsored communication thread control 218c, as shown in FIG. 2E. In particular, the dynamic communication system reorders the sponsored communication thread list 216 such that the sponsored communication thread control 218c is first. In this manner, the dynamic communication system 100 provides a reminder to the user of the client device 202 to interact with the screened communication thread associated with the sponsored communication thread control 218c.

The dynamic communication system 100 can provide alternative or additional reminders associated with a screened communication thread. For example, in one or more embodiments, in response to determining that the user has selected a sponsored communication thread control associated with a screened communication thread (e.g., opening the screened communication thread), but has failed to interact any further with the screened communication thread after a threshold period of time, the dynamic communication system 100 may move the sponsored communication thread control from the sponsored communication thread list 216 into the communication thread list 214. Similarly, in response to determining that the user has started typing a reply to the sponsor in a screened communication thread, but has yet to send the reply after a threshold period of time, the dynamic communication system 100 can generate and add a message to the screened communication thread. For example, the new message may include a discount code or coupon related the sponsored digital content item associated with the screened communication thread.

Although FIGS. 2A-2E illustrate a sponsored digital content items and a screened communication threads corresponding to a digital advertisement, the dynamic communication system 100 can provide sponsored digital content items and screened communication threads for a variety of other items. For example, the dynamic communication system 100 can provide sponsored digital content items comprising news articles, digital games, or digital media (e.g., digital images or digital videos). The dynamic communication system 100 can generate screened communication threads corresponding to these sponsored digital content items, detect user interaction with the screened communication threads, and convert the screened communication threads to open communication threads between the user and the sponsor of the sponsored digital content item.

Figure 3:
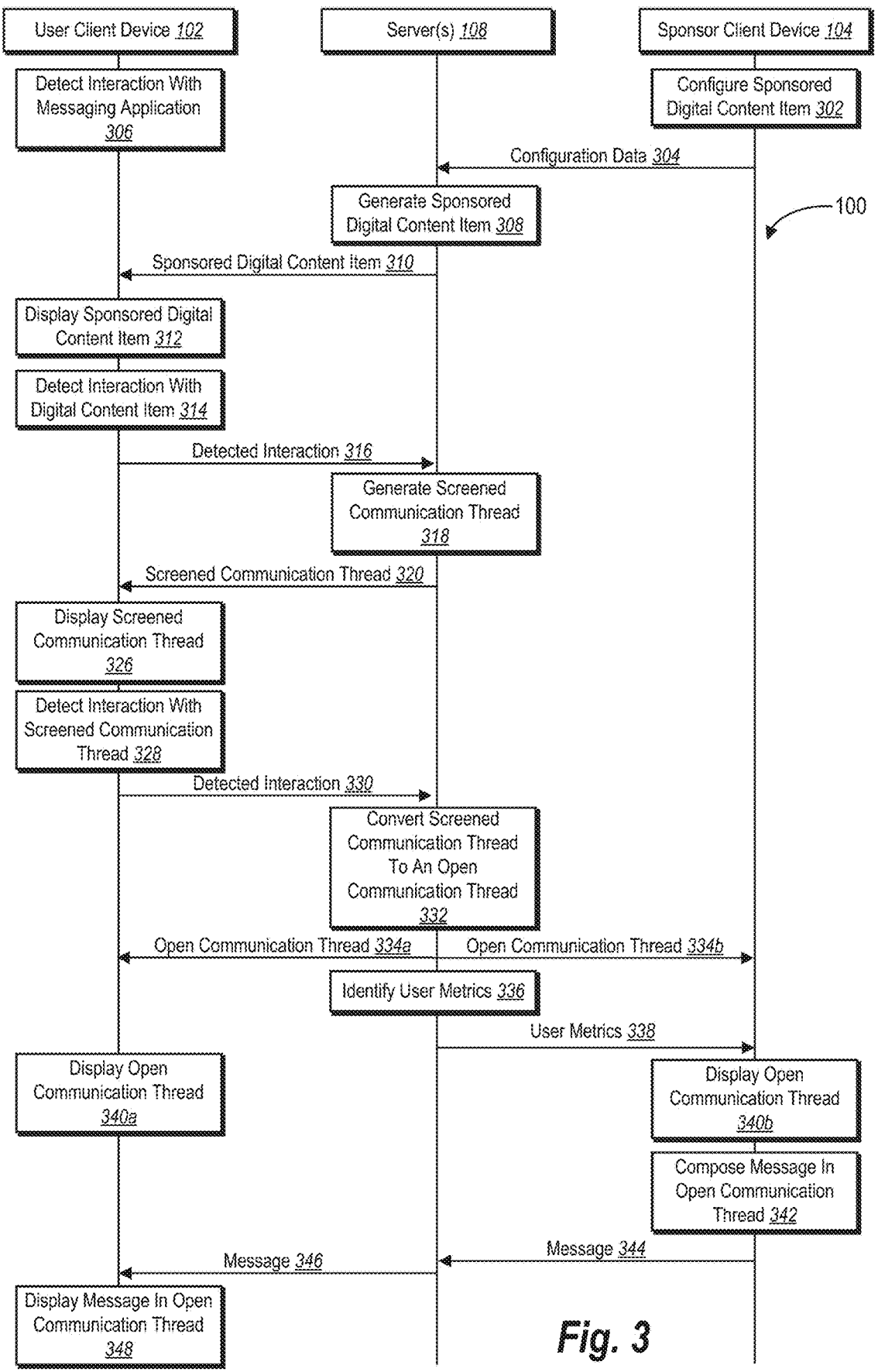
FIG. 3 illustrates a sequence diagram illustrating various features in accordance with one or more embodiments of the dynamic communication system.

The embodiments described with reference to FIGS. 2A-2E illustrates various GUIs and features of the dynamic communication system 100 in connection with a sponsored digital content item provided via the social networking system 110 and the electronic messaging system 114. In additional embodiments, the dynamic communication system 100 can provide this functionality across computing platforms. For example, FIG. 3 illustrates an example sequence diagram of a series of acts in a method implemented by at least one embodiment of the dynamic communication system 100. Consistent with the dynamic communication system 100 described above, FIG. 3 illustrates the server(s) 108 facilitating communication between the user client device 102 and the sponsor client device 104.

In one or more embodiments, prior to providing a sponsored digital content item, the dynamic communication system 100 enables a sponsor to configure the sponsored digital content item (302) via the sponsor client device 104. For example, in order to configure a sponsored digital content item, the sponsor can provide configuration information related to the sponsored digital content item to the dynamic communication system 100. For instance, the sponsor can provide configuration information such as, but not limited to, a title of the sponsored digital content item, descriptive text for inclusion in the sponsored digital content item, digital media for inclusion in the sponsored digital content item, metadata associated with the sponsored digital content item, one or more hyperlinks associated with the sponsored digital content item, formatting instructions related to the sponsored digital content item, HTML related to the sponsored digital content item, or computer code related to the sponsored digital content item.

In at least one embodiment, the configuration data related to a sponsored digital content item also includes targeting characteristics. For example, the sponsor can specify a demographic profile associated with the users to whom the dynamic communication system 100 provides the sponsored digital content item. In one or more embodiments, the sponsor can specify targeting characteristics including: gender, age, geographic location, language, time zone, networking system activity level, etc. The dynamic communication system 100 may provide one or more GUIs for display on the sponsor client device 104 with fields, controls, text boxes, and so forth that enable the sponsor to provide configuration data (304) to the dynamic communication system 100.

Also, as shown in FIG. 3, the user client device 102 detects various interactions with a variety of messaging applications (306). For example, in at least one embodiment, the user of the user client device 102 utilizes more than one messaging application. For instance, the user of the user client device 102 may utilize a messaging application associated with the social networking system 110 in addition to other messaging applications (e.g., another standalone messaging application, a messaging application associated with the user's email host, etc.). Thus, in one or more embodiments, the dynamic communication system 100 analyzes the detected interactions between the user and the various messaging applications.

Specifically, the dynamic communication system 100 can detect user interactions relative to each of the various messaging applications. For example, the dynamic communication system 100, can detect the frequency that a user utilizes one or more messaging application, the types of interactions the user has relative to each messaging application (e.g., sending and/or receiving messages, utilizing plug-ins, making purchases, sending or receiving funds, or playing games), or the co-users which with the user interacts via each messaging application. Accordingly, the dynamic communication system 100 can determine which messaging application the user utilizes to interact with friends and family member or which messaging application the user utilizes to interact with sponsors and business entities. Thus, in at least one embodiment, the dynamic communication system 100 maintains an active analysis of the user's messaging application usage in order select a messaging application to utilize in providing communication threads (e.g., screened and open).

In response to receiving the configuration data (304), the dynamic communication system 100 generates a sponsored digital content item (308) at the server(s) 108. For example, utilizing the configuration data (304), the server(s) 108 generate one or more of a social networking system post, a web page element, a structured data item, an email, or an SMS message. If the sponsored digital content item is a social networking system post, the server(s) 108 can provide the sponsored digital content item to the social networking system 110 for provision to social networking system users based on the sponsor's specified targeting characteristics.

If the sponsored digital content item is a different type of web page element (e.g., an optimized search engine result, a banner advertisement, etc.), the server(s) 108 can provide the sponsored digital content item to the appropriate web server. In that case, the dynamic communication system 100 also includes in the sponsored digital content item a mechanism to track interactions with the sponsored digital content item. For example, the dynamic communication system 100 can include a tracking pixel, or other computer code as part of the sponsored digital content item that provides interaction data to the dynamic communication system 100.

As shown in FIG. 3, the dynamic communication system 100 then provides (310) the sponsored digital content item to the user via the user client device 102. As mentioned above, in at least one embodiment, the dynamic communication system 100 provides (310) the sponsored digital content item to the user in response to determining that the user matches the targeting characteristics preconfigured by the sponsor. For example, the dynamic communication system 100 can analyze networking system activity history data, browser history data, etc. to determine the user's gender, age, location, and so forth.

Additionally, as discussed above, the dynamic communication system 100 can display the sponsored digital content item as part of a social networking system GUI, as part of a web page, as part of an email, as part of an electronic message, and so forth. Accordingly, the user client device 102 displays the sponsored digital content item (312) via the social networking system application 106a, via a web browser, via an email application, or via the electronic messaging system application 116a.

Next, the dynamic communication system 100 detects an interaction (314) between the user of the user client device 102 and the sponsored digital content item. As described above, the dynamic communication system 100 can detect a variety of different types of user interactions with the sponsored digital content item. For example, the dynamic communication system 100 can detect a scroll-stop relative to the sponsored digital content item, a selection of the sponsored digital content item, social networking system activity related to the sponsored digital content item, a drag event over or including the sponsored digital content item, a front-facing camera image showing user eye placement, and so forth.

In one or more embodiments, the dynamic communication system 100 provides information related to the detected interaction (316) to the server(s) 108. For example, in one embodiment, the information related to the detected interaction (316) includes the type of the detected interaction (e.g., a tap, a click, a scroll-stop, etc.). Additionally, the information related to the detected interaction (316) can also include additional information such as a duration of the interaction with the sponsored digital content item, the content of a social networking system comment associated with the sponsored digital content item, etc.

Similarly, the dynamic communication system 100 can aggregate user interactions relative to the sponsored digital content item and provide the aggregated information to the sponsor client device 104. For example, the dynamic communication system 100 can detect and provide information regarding the number of user interactions (e.g., number of selections) with the sponsored digital content item, the average duration of a user interaction, or the number of social networking system comments (or "likes") corresponding to the sponsored digital content item.

In at least one embodiment, in response to receiving information associated with the detected interaction (316), the dynamic communication system 100 generates a screened communication thread (318) associated with the sponsored digital content item. For example, the dynamic communication system 100 generates the screened communication thread by generating a communication thread between the user and the sponsor, but only making the screened communication thread available to the user. In one or more embodiments, the dynamic communication system 100 makes the screened communication thread available only to the user by adding the screened communication thread (e.g., one or more electronic messages in the screened communication thread) to a stack of communication threads associated with the user (e.g., a stack of electronic communications accessible by the user client device 102), but not adding the screened communication thread to the stack of communication threads associated with the sponsor. Thus, the dynamic communication system provides the screened communication thread (320) to the user where it is displayed (326) via the user client device 102.

In one or more embodiments, the dynamic communication system 100 determines the messaging application in which to display the screened communication thread (326). For example, as mentioned above, the dynamic communication system 100 monitors the use of one or more messaging applications installed on the user client device 102. The dynamic communication system 100 then analyzes this usage data to determine activity level of the user with regard to the one or more messaging applications.

For example, the dynamic communication system 100 can determine whether the user ever interacts with sponsors or business entities via a communication thread. If the user has never interacted with a sponsor via a communication thread, the dynamic communication system 100 may determine to not display the screened communication thread via the user client device 102. The dynamic communication system 100 can also analyze the usage data to determine that a first messaging application has a greater usage rate than a second messaging application. Based on this determination, the dynamic communication system 100 may display the screened communication thread (326) via the first messaging application. Alternatively, the dynamic communication system 100 may determine that while the first and second messaging applications have an equal usage rate, the first messaging application includes mostly threads between the user and the user's friends and family, and the second messaging application includes mostly threads between the user and various sponsors and business entities. Based on this determination, the dynamic communication system 100 may display the screened communication thread (326) via the second messaging application.

Furthermore, in at least one embodiment, the dynamic communication system 100 analyzes existing communication threads across each available messaging application to determine whether a communication thread associated with the sponsor already exists. For example, the user may have previously interacted with a sponsored digital content item that was part of an earlier campaign by the sponsor. As such, a screened or open communication thread between the user and the sponsor may already exist. In at least one embodiment, and in response to identifying the previous communication thread, the dynamic communication system 100 adds the contents of the newly generated screened communication thread 320 to the previous communication thread, and converts the previous communication thread to a screened communication thread. Thus, if the previous communication thread was an open communication thread and was included in a stack of communication threads associated with the sponsor, the dynamic communication system 100 removes the previous communication thread from the sponsor's stack of communication threads.

In one or more embodiments, the dynamic communication system 100 converts an open communication thread to a partially screened communication thread. For example, rather than removing an open communication thread so that it is not available to a sponsor at all, the dynamic communication system can withhold one or more new electronic messages from the sponsor while leaving one or more older electronic messages. To illustrate, in response to user selection of a sponsored digital content item, the dynamic communication system 100 can determine that a user has an open communication thread with a sponsor. The dynamic communication system 100 can generate a new message that includes an indicator of the sponsored digital content item and add the new message to a partially screened communication thread. Specifically, the dynamic communication system 100 makes the new message in the partially screened communication thread available to the user while withholding the new message from the sponsor. Thus, the sponsor can access older messages with the user in the partially screened communication thread, but cannot access the new message.

For example, the dynamic communication system 100 can add the new message to a communication thread stack of the user. Moreover, the dynamic communication system 100 can withhold the new message from the communication thread stack of the sponsor. Upon user interaction with the partially screened communication thread, the dynamic communication system 100 can convert the partially screened communication thread to an open communication thread and provide the new message to the sponsor.

Alternatively, the dynamic communication system 100 may ignore any previous communication threads between the user and the sponsor, and may treat each interaction with a new sponsored digital content item as a new communication transaction between the user and the sponsor. For instance, the dynamic communication system 100 can create a new screened communication thread based on the new user interaction. The dynamic communication system 100 can then convert the screened communication to an open communication thread based on user interaction with the screened communication thread.

Indeed, after displaying the screened communication thread (326) via the user client device 102, the dynamic communication system 100 detects a user interaction with the screened communication thread (328). As discussed above, the dynamic communication system 100 can detect a variety of user interactions including user selection of the screened communication thread, user selection of an indicator of the sponsored digital content item within the screened communication thread, typing associated with the screened communication thread, or a reply to the sponsor sent via the screened communication thread. For example, in at least one embodiment, the detected interaction with the screened communication thread (328) is a reply to the sponsor sent via the screened communication thread.

As shown in FIG. 3, the user client device 102 can provide the detected interaction (330) to the server(s) 108. In response to receiving the detected interaction (330) (e.g., a reply message sent via the screened communication thread), the dynamic communication system 100 converts the screened communication thread to an open communication thread (332). As discussed above, the dynamic communication system 100 converts the screened communication thread to an open communication thread (332) by making the screened communication thread available to both the user and the sponsor. In at least one embodiment, the dynamic communication system 100 makes the screened communication thread available to both the user and the sponsor by adding the communication thread to a stack of communication threads associated with the sponsor via and a stack of communication thread associated with the user via the server(s) 108.

The dynamic communication system 100 can also provide the open communication thread to the sponsor and the user via one or more messaging applications on the user client device 102 and sponsor client device 104. Indeed, as shown in FIG. 3, following the conversion step (332), the dynamic communication system 100 makes the open communication thread available to the user (334*a*) where it is displayed (340*a*) by the user client device 102, and makes the open communication thread available to the sponsor (334*b*) where it is displayed (340*b*) by the sponsor client device 104.

As shown in FIG. 3, the dynamic communication system 100 also identifies user metrics (336) to provide (338) to the sponsor via the sponsor client device 104 consistent with privacy settings of the user. For example, once the dynamic communication system 100 converts the screened communication thread to an open communication thread, the dynamic communication system 100 identifies and provides user metrics such as the user's screen name (e.g., networking system screenname, messaging application screenname, etc.), the user's purchase history (e.g., a networking system purchase history, an Internet purchasing history, etc.), the user's browsing history, the user's messaging application usage history, or the user's networking system profile information. The sponsor can utilize such information to provide additional information to the user, such as targeted discounts or targeted information regarding the sponsored digital content.

Moreover, because the sponsor has access to the open communication thread, the sponsor may compose a message in the open communication thread (342) via the sponsor client device 104. In response to detecting a submission of a message in the open communication thread, the dynamic communication system 100 provides the message (344) to the server(s) 108, which in turn provides the message (346) to the user client device 102 for display in the open communication thread (348). In this manner, the user and the sponsor can exchange digital communications via the open communication thread. For example, the user and the sponsor can ask and answer questions, transact purchases, and so forth.

The method described in relation to FIG. 3 is intended to be illustrative of one or more methods in accordance with the present disclosure, and is not intended to limit potential embodiments. Alternative embodiments can include additional, fewer, or different acts than those articulated in FIG. 3. For example, although FIG. 3 illustrates the sponsor client device 104 composing a message in an open communication thread (342), in one or more embodiments, the sponsor may not draft a digital message. Similarly, although not illustrated, the user client device 102 can draft additional messages in the open communication thread.

Additionally, the acts described herein may be performed in a different order, may be repeated or performed in parallel with one another, or may be performed in parallel with different instances of the same or similar acts. For example, although FIG. 3 illustrates identifying user metrics (336) and providing user metrics (338) at a particular order in relation to other acts, the dynamic communication system 100 can identify and provide user metrics at a variety of different points in time while performing the method.

To illustrate, the dynamic communication system 100 can track user interactions with sponsored digital content items at any time and provide information regarding user interaction with the sponsored digital content item. Similarly, the dynamic communication system 100 can detect user interaction with screened communication threads or open communication threads and provide information regarding user interaction with the screened communication threads or open communications threads.

For instance, in one or more embodiments, the dynamic communication system 100 tracks how many screened communication threads have been generated, how many users have interacted with a screened communication thread corresponding to the sponsored digital content item, what types of interactions have been detected in association with each screened communication thread, or geographic regions where users have interacted with screened communication threads. The dynamic communication system can then provide such user metrics to the sponsor client device 104.

In one or more embodiments, the dynamic communication system can manage the user metrics and selectively provide information to the sponsor client device 104 depending on what other acts have been performed. For example, in one or more embodiments, the dynamic communication system 100 withholds information from the sponsor until a user sends a reply message to the sponsor via the screened communication thread. In other embodiments, the dynamic communication system 100 withholds information identifying a user but provides more general information to the sponsor client device 104 prior to the user of the user client device 102 sending a reply via the screened communication thread.

For example, prior to the user client device 102 sending a reply message, in one or more embodiments, the dynamic communication system 100 provides information to the sponsor regarding the number of selections of the sponsored digital content item, the number of screened communication threads generated, the number of users that have interacted with the screened communication thread, or the type of user interactions with sponsored communication thread. For instance, the dynamic communication system 100 can provide the number of users that have typed within a screened communication thread (but have not sent a reply message).

In at least one embodiment, the dynamic communication system 100 provides different levels of user information and metrics (324) to the sponsor depending on the type of interactions detected with the screened communication thread (328) and provided (330) to the server(s) 108. For example, as discussed above, the dynamic communication system 100 may always provide metrics such as the ages and genders of users who interact with sponsored digital content item and/or who select the screened communication thread. In at least one embodiment, the dynamic communication system 100 provides more specific metrics such as a user's networking system activity history (or an analysis thereof) in response to detecting typing in association with the screened communication thread. In one or more embodiments, the dynamic communication system 100 can provide the interaction metrics (324) to the sponsor client device 104 as raw data, as an analysis report, as a web page, or as an email.

Figure 4:
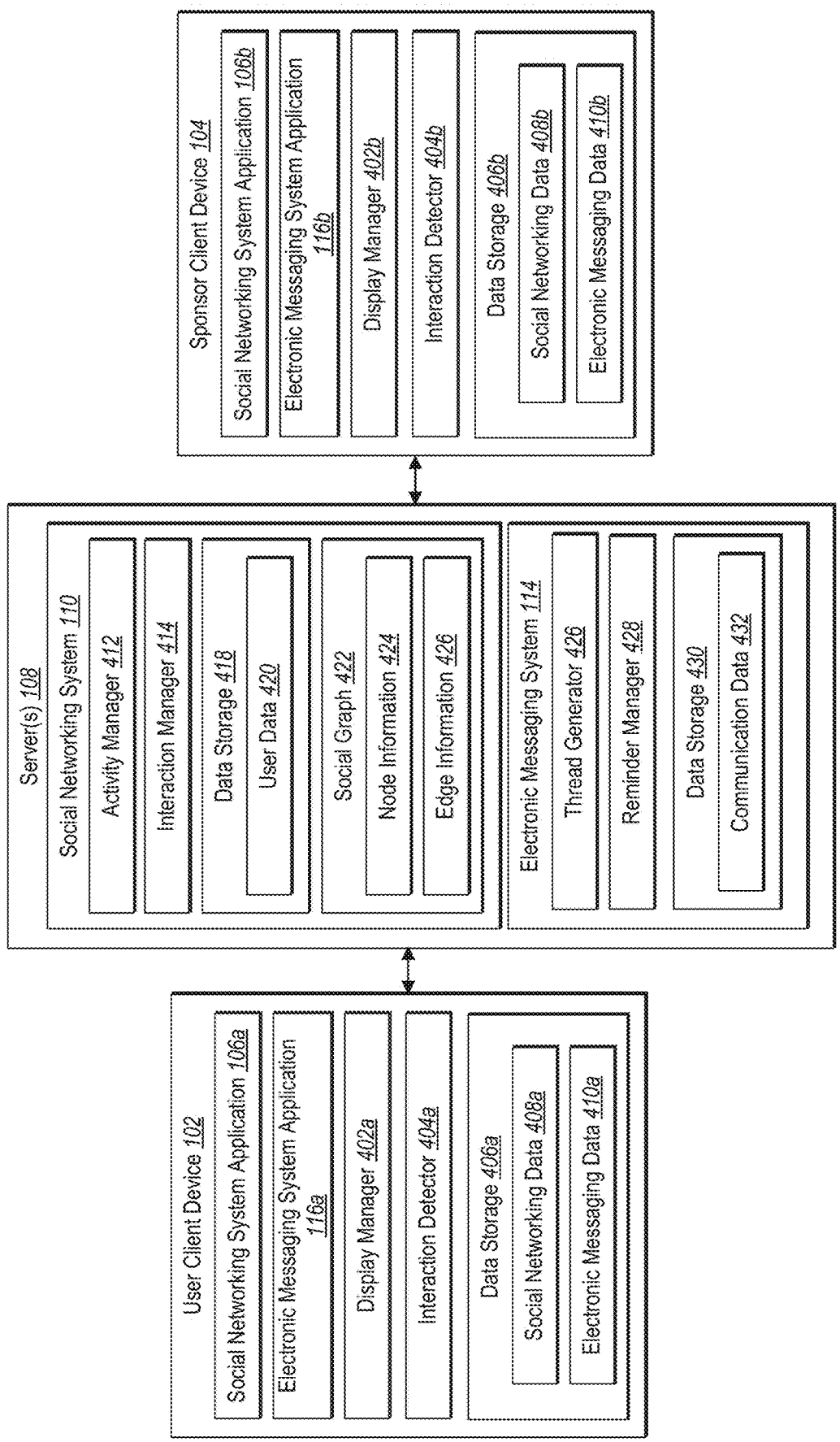
FIG. 4 illustrates a detailed schematic diagram of the dynamic communication system in accordance with one or more embodiments.

Turning now to FIG. 4, additional detail will be provided regarding components and capabilities of the dynamic communication system 100 in accordance with one or more embodiments. In particular, FIG. 4 illustrates a schematic diagram of another example embodiment of the dynamic communication system 100. As shown in FIG. 4, the dynamic communication system 100 includes various components for performing the processes and features described herein. For example, as shown in FIG. 4, the dynamic communication system 100 includes but is not limited to, the user client device 102, the sponsor client device 104, and the server(s) 108 hosting the social networking system 110 and the electronic messaging system 114. Further illustrated in FIG. 4, the social networking system 110 includes an activity manager 412, an interaction manager 414, a data storage 418 storing user data 420, and a social graph 422 including node information 424 and edge information 426. Also illustrated in FIG. 4, the electronic messaging system 114 includes a thread generator 426, a reminder manager 428, and a data storage 430 storing communication data 432. Additionally, the user client device 102 and the sponsor client device 104 include the networking system application 106a, 106b, the electronic messaging system application 116a, 116b, a display manager 402a, 402b, an interaction detector 404a, 404b, and a data storage 406a storing social networking data 408a, 408b and electronic messaging data 410a, 410b, respectively.

In at least one embodiment, the dynamic communication system 100 accesses the social networking system 110 in order to identify and analyze social networking system user data. Accordingly, as shown in FIG. 4, the social networking system 110 includes a social graph 422 for representing a plurality of users, actions, and concepts. For example, in one or more embodiments, the social graph 422 is accessible by the social networking system 108 and the electronic messaging system 114. In one or more embodiments, the social graph 422 includes node information 424 and edge information 426. Node information 424 of the social graph 422 stores information including, for example, nodes for users and nodes for repositories. Edge information 426 of the social graph 422 stores information including relationships between nodes and/or actions occurring within the social networking system 110. Further details regarding the social networking system 110, the social graph 422, edges, and nodes are presented below with respect to FIG. 8.

Each of the components 106a, 116a, and 402a through 406a of the user client device 102, the components 106b, 116b, and 402b through 406b of the sponsor client device 102, the components 412-422 of the social networking system 110, and the components 426-430 of the electronic messaging system 114 can be implemented using a computing device including at least one processor executing instructions that cause the dynamic communication system 100 to perform the processes described herein. In some embodiments, the components of the dynamic communication system 100 can be implemented by the server(s) 108, or across multiple server devices. Additionally or alternatively, a combination of one or more server devices and one or more client devices can implement the components of the dynamic communication system 100. Additionally or alternatively, the components of the dynamic communication system 100 can comprise a combination of computer-executable instructions and hardware.

In one or more embodiments, the social networking system application 106a, 106b and/or the electronic messaging system application 116a, 116b are native applications installed on the user client device 102 and the sponsor client device 104, respectively. For example, the social networking system application 106a, 106b and/or the electronic messaging system application 116a, 116b can be mobile applications that install and run on a mobile device, such as a smart phone or tablet computer. Alternatively, the social networking system application 106a, 106b and/or the electronic messaging system application 116a, 116b can be desktop applications, widgets, or other form of a native computer programs. Furthermore, the social networking system application 106a, 106b and/or the electronic messaging system application 116a, 116b may be remote applications accessed by the user client device 102 or the sponsor client device 104, respectively. For example, the social networking system application 106a, 106b and/or the electronic messaging system application 116a, 116b may be web applications that are executed within a web browser of the user client device 102 or the sponsor client device 104, respectively.

As mentioned above, and as shown in FIG. 4, the user client device 102 and the sponsor client device 104 include a display manager 402a, 402b, respectively. In one or more embodiments, the display manager 402a, 402b interacts with both the social networking system application 106a, 106b and the electronic messaging system application 116a, 116b. The display manager 402a, 402b provides, manages, and/or controls a graphical user interfaces that allow a user to interact with the networking system 110. For example, the display manager 402a, 402b provides a graphical user interface that facilitates the display of a networking system user's newsfeed (e.g., the newsfeed 208 illustrated in FIG. 2A) including multiple posts and sponsored digital content items. Similarly, the display manager 402a, 402b provides a graphical user interface that displays one or more communication threads available to the user of the user client device 102.

More specifically, the display manager 402a, 402b facilitates the display of a graphical user interface (e.g., by way of a touch screen display associated with the user client device 102 or the sponsor client device 104). For example, the display manager 402a, 402b may compose the graphical user interface of a plurality of graphical components, objects, and/or elements that allow a user to view and interact with sponsored digital content items and communication threads. Further, the display manager 402a, 402b directs the user client device 102 and the sponsor client device 104, respectively, to display one or more graphical objects, controls, or elements that facilitate user input for interacting with sponsored content items, communication threads, etc. For example, in one or more embodiments, the display manager 402a, 402b provides a graphical user interface that includes a touch screen keyboard.

Additionally, the display manager 402a, 402b is capable of transitioning between two or more graphical user interfaces and/or applications. For example, in one embodiment, the display manager 402a provides a newsfeed to a networking system user within the social networking system application 106a, containing one or more networking system posts from co-users associated with the user via the social networking system 110. Later, in response to a detected input, the display manager 402a transitions to a second graphical user interface within the electronic messaging system application 116a that includes a listing of one or more communication threads. Alternatively, in response to a detected input, the display manager 402a, 402b transitions within graphical user interfaces provided by the same application.

As further illustrated in FIG. 4, the user client device 102 and the sponsor client device 104 includes the interaction detector 404a, 404b, respectively. As with the display manager 402a, 402b, in one or more embodiments, the interaction detector 404a, 404b interacts with both the social networking system application 106a, 106b and the electronic messaging system application 116a, 116b. In one or more embodiments, the interaction detector 404a, 404b detects, receives, and/or facilitates user input in any suitable manner. In some examples, the interaction detector 404a, 404b detects one or more user interactions with a graphical user interface. As referred to herein, a "user interaction" means a single interaction, or combination of interactions, received from a user by way of one or more input devices.

For example, the interaction detector 404a, 404b detects a user interaction from a keyboard, mouse, touch pad, touch screen, and/or any other input device. In the event the user client device 102 and/or the sponsor client device 104 includes a touch screen, the interaction detector 404a, 404b detects one or more touch gestures (e.g., swipe gestures, tap gestures, pinch gestures, reverse pinch gestures, etc.) from a user and/or sponsor that forms a user interaction. In some examples, a user and/or sponsor can provide the touch gestures in relation to and/or directed at one or more graphical objects or graphical elements of a graphical user interface.

The interaction detector 404a, 404b may additionally, or alternatively, receive data representative of a user interaction. For example, the interaction detector 404a, 404b may receive one or more user configurable parameters from a user, one or more commands from the user, and/or any other suitable user input. The interaction detector 404a, 404b may receive input data from one or more components of the social networking system 110, or from one or more remote locations.

The social networking system application 106a, 106b and/or the electronic messaging system application 116a, 116b performs one or more functions in response to the interaction detector 404a, 404b detecting user input and/or receiving other data. Generally, a user and/or sponsor can control, navigate within, and otherwise use the social networking system application 106a, 106b and/or the electronic messaging system application 116a, 116b by providing one or more user input that the interaction detector 404a, 404b can detect. For example, in response to the interaction detector 404a, 404b detecting user input, one or more components of the social networking system application 106a, 106b allow a user and/or sponsor to scroll through a newsfeed, select a sponsored digital content item, or submit a comment to a post. Similarly, in response to the interaction detector 404a, 404b detecting user input, one or more components of the electronic messaging system application 116a, 116b allow a user and/or sponsor to view a communication thread list, select a communication thread control 220, or interact with a communication thread.

As shown in FIG. 4, and as mentioned above, the user client device 102 and sponsor client device 104 also include the data storage 406a, 406b. The data storage 406a, 406b includes social networking data 408a, 408b and electronic messaging data 410a, 410b. In one or more embodiments, the social networking data 408a, 408b is representative of social networking information, such as described herein. In one or more embodiments, the electronic messaging data 410a, 410b is representative of electronic messaging information, such as described herein.

As further shown in FIG. 4, and as mentioned above, the server(s) 108 hosts the social networking system 110. The social networking system 110 provides networking system posts and sponsored digital media items to one or more users of the social networking system 110 (e.g., by way of a profile, a newsfeed, a timeline, or a "wall"). For example, one or more embodiments provide a user with a networking system newsfeed including sponsored digital content items, as well as posts from one or more co-users associated with the user via the social networking system 110. In one or more embodiments, the user scrolls through the social networking system newsfeed, interacting with posts and sponsored digital content items of interest.

As shown in FIG. 4, the social networking system 110 includes the activity manager 412. In one or more embodiments, the activity manager 412 monitors social networking system activity associated with a user. For example, as discussed above and based on certain levels of interaction with a sponsored digital content item or screened communication thread, the dynamic communication system 100 provides a user's networking system activity information to a sponsor. Thus, the activity manager 412 monitors the user's social networking system "likes," social networking system shares, social networking system comments, social networking system purchases, and social networking system newsfeed interactions, and other social networking system activities.

Additionally, in one or more embodiments, the activity manager 412 monitors the user's other Internet activities. For example, in at least one embodiment, the social networking system application 106a accesses browser data (e.g., cookies and other cached data) on the user client device 102 and provides that data to the activity manager 412. The activity manager 412 receives and monitors this data.

Furthermore, the activity manager 412 also monitors messaging application usage. For example, as discussed above, the user client device 102 may operate the electronic messaging system application 116a in addition to other electronic messaging applications. In that embodiment, the networking system application 106a and/or the electronic messaging system application 116a provides usage data related to each installed messaging application to the activity manager 412. Thus, the activity manager 412 monitors the usage rate of each messaging application, and the type of communication threads that exist within each messaging application.

In one or more embodiments, the activity manager 412 also collects and compiles interaction information for the sponsor. For example, as described above, the dynamic communication system 100 provides various levels of user information to the sponsor. Accordingly, the activity manager 412 collects and provides information to the sponsor including, but not limited to, a number of users who interacted with the sponsored digital content item, the types of interactions detected relative to the sponsored digital content item, general demographic information related to the users who interacted with the sponsored digital content item, a number of screened communication threads generated, levels of interaction with a particular screened communication thread, or user information appropriate to a level of interaction with a particular screened communication thread.

As further shown in FIG. 4, the social networking system 110 includes the interaction manager 414. In one or more embodiments, the interaction manager 414 receives and analyzes interaction information provided by the social networking system application 106a and/or the electronic messaging system application 116a. For example, the interaction manager 414 receives interaction information (e.g., the type of interaction, the duration of the interaction, etc.) and determines whether a user of the user client device 102 has interacted with a sponsored digital content item. Further, the interaction manager 414 receives interaction information and determines a level of interaction relative to a screened communication thread, as described above.

As shown in FIG. 4, and as mentioned above, the social networking system 110 includes the data storage 418. The data storage 418 includes user data 420. In one or more embodiments, the user data 420 is representative of user information, such as described herein.

Further illustrated in FIG. 4, the server(s) 108 support the electronic messaging system 114. As discussed above, the electronic messaging system 114 provides a dedicated electronic messaging services to the user and to the sponsor. For example, the electronic messaging system 114 maintains a stack of communication threads associated with each electronic messaging system user. The electronic messaging system 114 can add a communication thread (or digital message) to a particular stack in order to make the communication thread available to the user associated with the stack, or can remove a communication thread (or digital message) from the stack in order to make the communication thread (or digital message) unavailable to the user associated with the stack.

As shown in FIG. 4, the electronic messaging system 114 includes the thread generator 426. In one or more embodiments, in response to the interaction manager 414 of the social networking system 110 determining that a user has interacted with a sponsored digital content item, the thread generator 426 generates a screened communication thread between the user and the sponsor associated with the sponsored digital content item. As discussed above, the thread generator 426 only adds the screened communication thread to a stack of communication threads associated with the user. Thus, the screened communication thread is not available to the sponsor.

Furthermore, the thread generator 426 also analyzes monitored electronic messaging application data (e.g., provided by the electronic messaging system application 116a, or by other electronic messaging applications) to determine the most appropriate messaging application through which to provide the screened communication thread. For example, each messaging application installed on the user client device 102 has a stack of communication threads associated with the user of the user client device 102. Accordingly, the thread generator 426 analyzes monitored messaging application data to determine which messaging application the user utilizes most frequently, and adds the screened communication thread to the user's stack associated with the determined messaging application. Additionally or alternatively, the thread generator 426 can add the screened communication thread to the user's stack associated with a messaging application that the user utilizes most frequently to communicate with business entities or sponsors. In at least one embodiment, the thread generator 426 may determine not to add the screened communication thread to any of the user's stacks in response to determining that the user has explicitly blocked this or other sponsors, or has never interacted with previously provided screened communication threads.

The thread generator 426 can also generate a communication thread for multiple messaging applications. For example, the thread generator 426 can provide a first screened communication thread via a first messaging application. After determining that a user has not interacted with the screened communication message (or the first messaging application) for a threshold period of time, the thread generator 426 can generate a second screened communication thread and provide the second screened communication thread via a second messaging application.

The thread generator 426 also determines whether a communication thread between the user and the sponsor already exists. For example, in one or embodiments, the user has previously interacted with a different sponsored digital content item provided by the same sponsor. Accordingly, in such embodiments, the dynamic communication system 100 has already generated a screened communication thread between the user and that sponsor. The thread generator 426 can identify an existing screened communication thread, and can add the contents of the most recently generated screened communication thread to the existing screened communication thread. If the existing thread is an open communication thread, the thread generator 426 can add the contents of the most recently generated screened communication thread to the existing open communication thread, and can convert the open communication thread to a screened (or partially screened) communication thread.

Thus, in at least one embodiment, thread generator 426 converts a screened communication thread to an open communication thread. As discussed above, the thread generator 426 converts a screened communication thread to an open communication thread by adding the communication thread to a stack of communication threads associated with the sponsor. Accordingly, by converting the screened communication thread to an open communication thread, the thread generator 426 makes the thread available to both the user and to the sponsor.

In one or more embodiments, the thread generator 426 also generates a first message to include in a screened communication thread. For example, as shown in FIG. 2C, a screened communication thread can include a first message that includes an indicator of the sponsored digital content item. Accordingly, in at least one embodiment, the thread generator 426 generates the first message based on the sponsored digital content item. The thread generator 426 can utilize rules, grammars, machine learning, or templates to determine the contents of the generated message.

Also shown in FIG. 4, the electronic messaging system 114 includes the reminder manager 428. For example, as discussed above, the dynamic communication system 100 provides reminders related to a particular screened communication thread (e.g., when the user fails to interact with the screened communication thread after a threshold amount of time). To illustrate, the reminder manager 428 can determine whether a threshold amount of time has passed for a particular screened communication thread by continually monitoring the amount of time that has passed since the generation of the screened communication thread without any interactions with the screened communication thread.

In response to determining that the threshold amount of time has passed without any interactions with the screened communication thread, the reminder manager 428 determines the appropriate reminder. For example, if the user of the user client device 102 regularly interacts with screened communication threads, the reminder manager 428 can determine to provide a more noticeable reminder (e.g., highlighting the screened communication thread in the listing of communication threads, adding a notification icon to the screened communication thread in the listing of communication threads, etc.).

Furthermore, in one or more embodiments, the reminder manager 428 can generate a new message and provide the new message within the screened communication thread. For example, the new message can include text such as, "Are you still interested in this item? It just went on sale!" Alternatively, if the user regularly blocks sponsors within the messaging application, the reminder manager 428 can determine to provide a less noticeable reminder (e.g., repositioning the screened communication thread within the listing of communication threads). After determining the appropriate reminder for the communication thread, the reminder manager 428 generates and provides the reminder.

As shown in FIG. 4, and as mentioned above, the electronic messaging system 114 also includes the data storage 430. The data storage 430 includes communication data 432. In one or more embodiments, the communication data 432 is representative of communication information, such as described herein.

FIGS. 1-4, the corresponding text and examples, provide a number of different methods, systems, and devices for converting a screened communication thread to an open communication thread between a user and a sponsor. In addition to the foregoing, embodiments can also be described in terms of flowcharts comprising acts and steps in a method for accomplishing a particular result. For example, FIG. 5 may be performed with less or more steps/acts or the steps/acts may be performed in differing orders. Additionally, the steps/acts described herein may be repeated or performed in parallel with one another or in parallel with different instances of the same or similar steps/acts.

Figure 5:
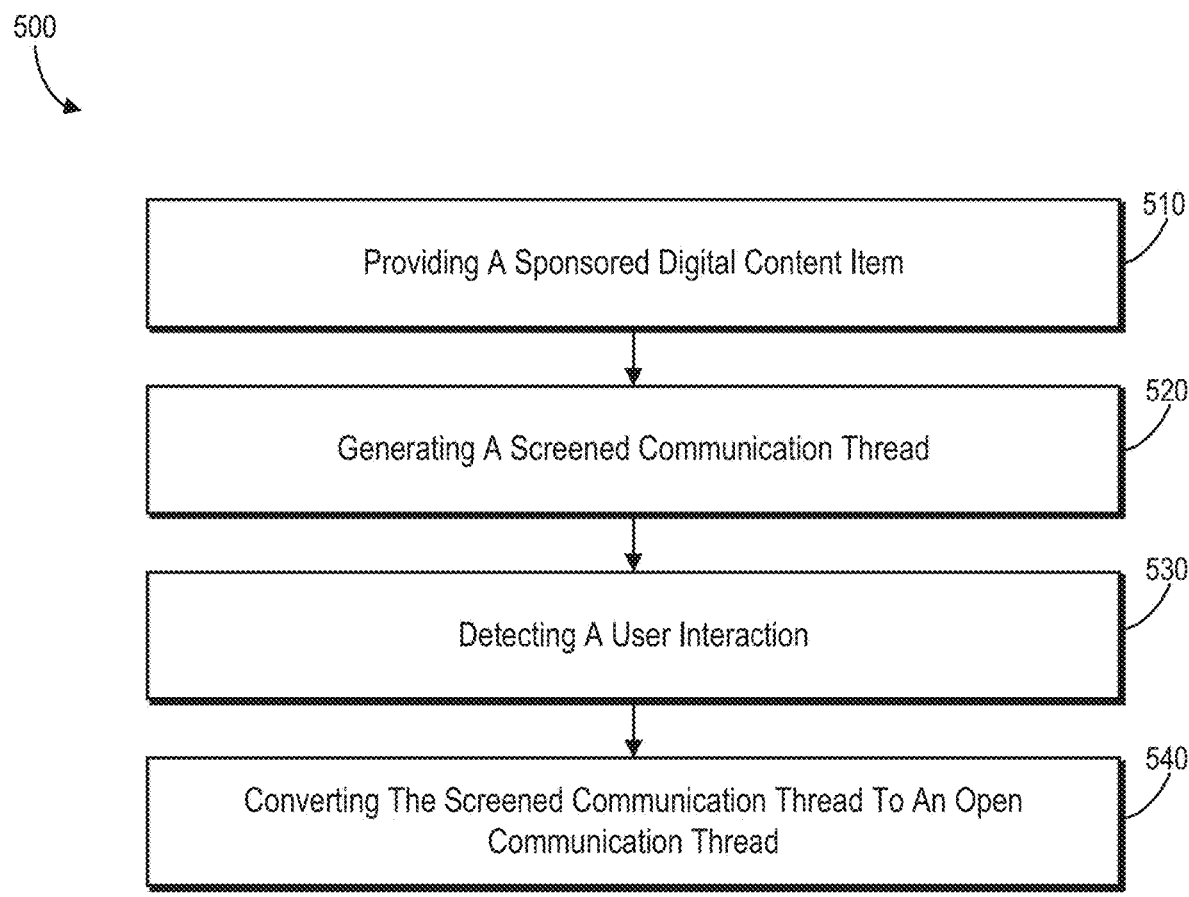
FIG. 5 illustrates a flowchart of a series of acts in a method of generating a dynamic communication thread based on user interaction with sponsored digital content in accordance with one or more embodiments.

FIG. 5 illustrates a flowchart of one example method 500 of generating a dynamic communication thread based on user interaction with a sponsored digital content item. The method 500 includes an act 510 of providing a sponsored digital content item. In particular, the act 510 can involve providing a sponsored digital content item corresponding to a sponsor for display via a client device of a user. For example, in at least one embodiment, providing the sponsored digital content item includes providing the sponsored digital content item via a networking system newsfeed.

The method 500 also includes an act 520 of generating a screened communication thread. In particular, the act 520 can involve, in response to detecting a user interaction with the sponsored digital content item, generating a screened communication thread between the sponsor and the user, wherein the screened communication thread is available to the user and not available to the sponsor. For example, in at least one embodiment, detecting the user interaction with the sponsored digital content item includes detecting at least one of the following via the networking system newsfeed: detecting a selection of the sponsored digital content item, detecting a scroll stop corresponding to the sponsored digital content item, or detecting a mouse hover corresponding to the sponsored digital content item.

Furthermore, in at least one embodiment, generating the screened communication thread further includes adding the sponsored digital content item to the screened communication thread available to the user and not available to the sponsor in response to detecting the user interaction with the sponsored digital content item. Additionally, in at least one embodiment, the act 520 can include, upon generating the screened communication thread, withholding information associated with the user from the sponsor. In at least one embodiment, the act 520 can include, in response to the detected user interaction with the screened communication thread, providing the information associated with the user to the sponsor.

Furthermore, the method 500 includes an act 530 of detecting a user interaction. In particular, the act 530 can involve detecting a user interaction with the screened communication thread. For example, in one or more embodiments, detecting the user interaction with the screened communication thread includes at least one of: detecting the user opening the screened communication thread, detecting the user composing a message associated with the screened communication thread, detecting the user sending a message associated with the screened communication thread, or detecting the user interacting with a digital content item within the screened communication thread.

In one or more embodiments, the method 500 includes a further act of determining an activity level associated with the user relative to a messaging application. Additionally, the method 500 can include an act of adding the screened communication thread to a listing of communication threads associated with the user in the messaging application based on the determined activity level associated with the user relative to the messaging application. For example, in at least one embodiment, determining the activity level includes: determining a first activity level corresponding to the messaging application and a second activity level corresponding to a second messaging application, comparing the first activity level with the second activity level, and wherein adding the screened communication thread is further based on the comparison between the first activity level and the second activity level.

Furthermore, in at least one embodiment, the method 500 includes an act of determining a threshold amount of time has elapsed since adding the screened communication thread to the listing of communication threads associated with the user without the user interacting with the screened communication thread. Then, based on determining that the threshold amount of time has elapsed, the method 500 includes an act of providing a reminder associated with the screened communication thread. For example, the reminder can include one or more of: a repositioning of the screened communication thread within the listing of communication threads or generating a new message within the screened communication thread.

Also, the method 500 includes and act 540 of converting the screened communication thread to an open communication thread. In particular, the act 540 can involve, in response to the detected user interaction with the screened communication thread, converting the screened communication thread to an open communication thread between the sponsor and the user, wherein the open communication thread is available to the user and available to the sponsor.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
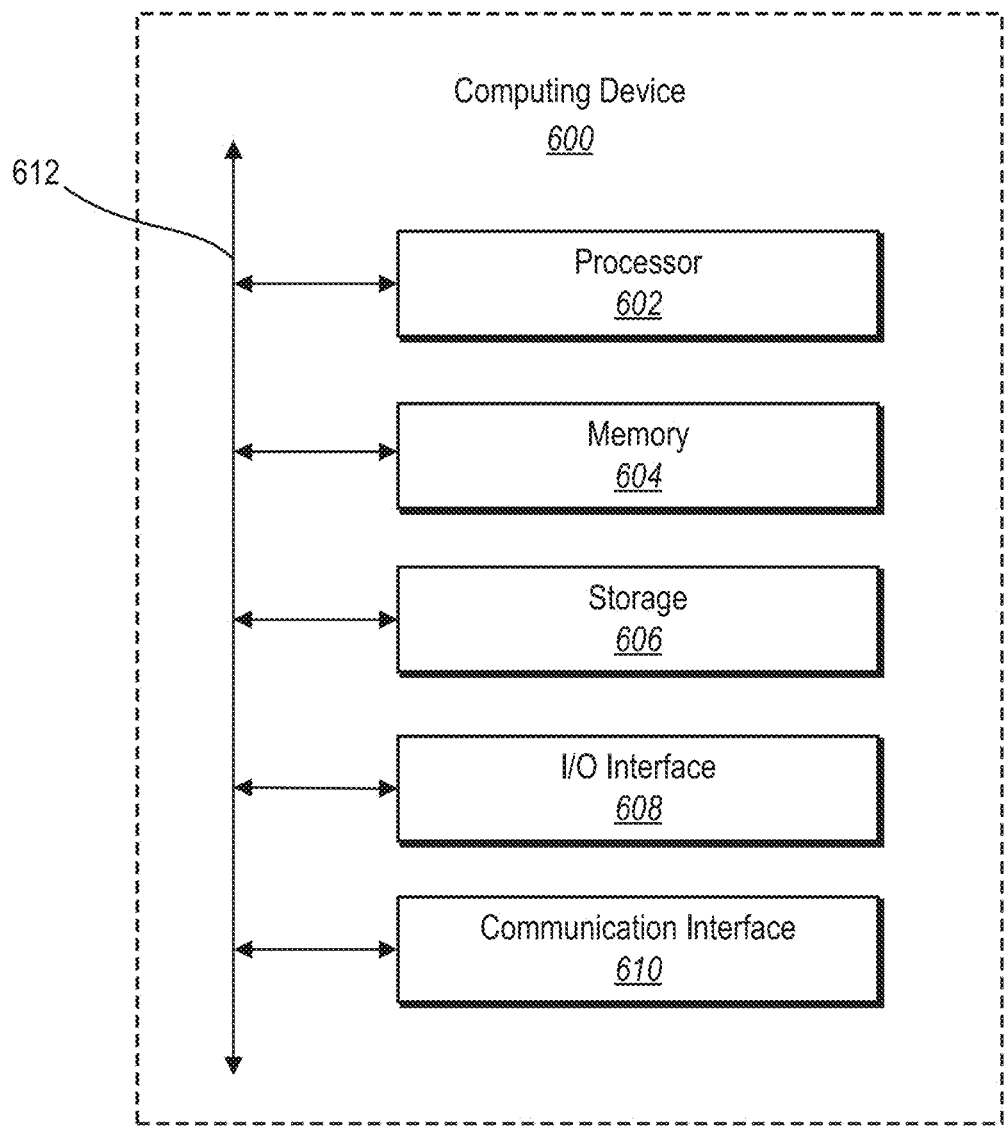
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the dynamic communication system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage device 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the dynamic communication system 100 can comprise a social networking system (e.g., the social networking system 110 as described with reference to FIG. 1). In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 7:
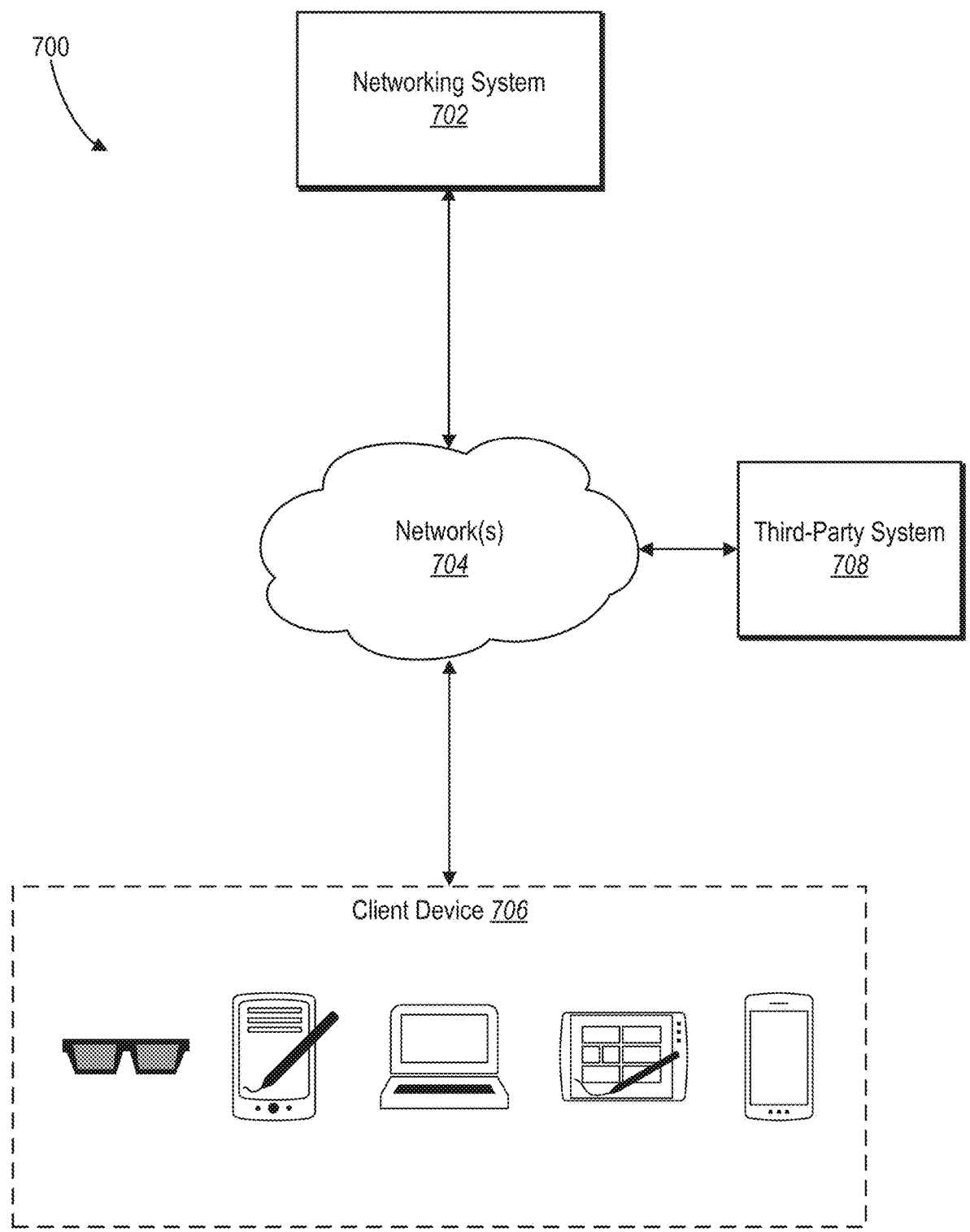
FIG. 7 illustrates an example network environment of a networking system in accordance with one or more embodiments.

FIG. 7 illustrates an example network environment 700 of a social networking system. Network environment 700 includes a client device 706, a networking system 702 (e.g., a social networking system and/or an electronic messaging system), and a third-party system 708 connected to each other by a network 704. Although FIG. 7 illustrates a particular arrangement of client device 706, networking system 702, third-party system 708, and network 704, this disclosure contemplates any suitable arrangement of client device 706, networking system 702, third-party system 708, and network 704. As an example and not by way of limitation, two or more of client device 706, networking system 702, and third-party system 708 may be connected to each other directly, bypassing network 704. As another example, two or more of client device 706, networking system 702, and third-party system 708 may be physically or logically co-located with each other in whole or in part. Moreover, although FIG. 7 illustrates a particular number of client devices 706, networking systems 702, third-party systems 708, and networks 704, this disclosure contemplates any suitable number of client devices 706, networking systems 702, third-party systems 708, and networks 704. As an example and not by way of limitation, network environment 700 may include multiple client device 706, networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client device 706, networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 706. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client device 706 one or more Hyper Text Markup Language (HTML) files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 702 may be a network-addressable computing system that can host an online social network. Networking system 702 may generate, store, receive, and send social-networking data, such as, for example, user-profile data, concept-profile data, social-graph information, or other suitable data related to the online social network. Networking system 702 may be accessed by the other components of network environment 700 either directly or via network 704. In particular embodiments, networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a networking system 702, or a third-party system 708 to manage, retrieve, modify, add, or delete, the information stored in data store.

In particular embodiments, networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 702 may provide users of the online social network the ability to communicate and interact with other users. In particular embodiments, users may join the online social network via networking system 702 and then add connections (e.g., relationships) to a number of other users of networking system 702 that they want to be connected to. Herein, the term "friend" may refer to any other user of networking system 702 with whom a user has formed a connection, association, or relationship via networking system 702.

In particular embodiments, networking system 702 may provide users with the ability to take actions on various types of items or objects, supported by networking system 702. As an example and not by way of limitation, the items and objects may include groups or social networks to which users of networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 702 or by an external system of third-party system 708, which is separate from networking system 702 and coupled to networking system 702 via a network 704.

In particular embodiments, networking system 702 may be capable of linking a variety of entities. As an example and not by way of limitation, networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating networking system 702. In particular embodiments, however, networking system 702 and third-party systems 708 may operate in conjunction with each other to provide social-networking services to users of networking system 702 or third-party systems 708. In this sense, networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 702 also includes user-generated content objects, which may enhance a user's interactions with networking system 702. User-generated content may include anything a user can add, upload, send, or "post" to networking system 702. As an example and not by way of limitation, a user communicates posts to networking system 702 from a client device 706. Posts may include data such as status updates or other textual data, location information, photos, videos, links, music or other similar data or media. Content may also be added to networking system 702 by a third-party through a "communication channel," such as a newsfeed or stream.

In particular embodiments, networking system 702 may include a variety of servers, sub-systems, programs, modules, logs, and data stores. In particular embodiments, networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 702 may also include suitable components such as network interfaces, security mechanisms, load balancers, failover servers, management-and-network-operations consoles, other suitable components, or any suitable combination thereof. In particular embodiments, networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 702 to one or more client devices 706 or one or more third-party system 708 via network 704. The web server may include a mail server or other messaging functionality for receiving and routing messages between networking system 702 and one or more client devices 706. An API-request server may allow a third-party system 708 to access information from networking system 702 by calling one or more APIs. An action logger may be used to receive communications from a web server about a user's actions on or off networking system 702. In conjunction with the action log, a third-party-content-object log may be maintained of user exposures to third-party-content-objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of networking system 702. A privacy setting of a user determines how particular information associated with a user can be shared. The authorization server may allow users to opt in to or opt out of having their actions logged by networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
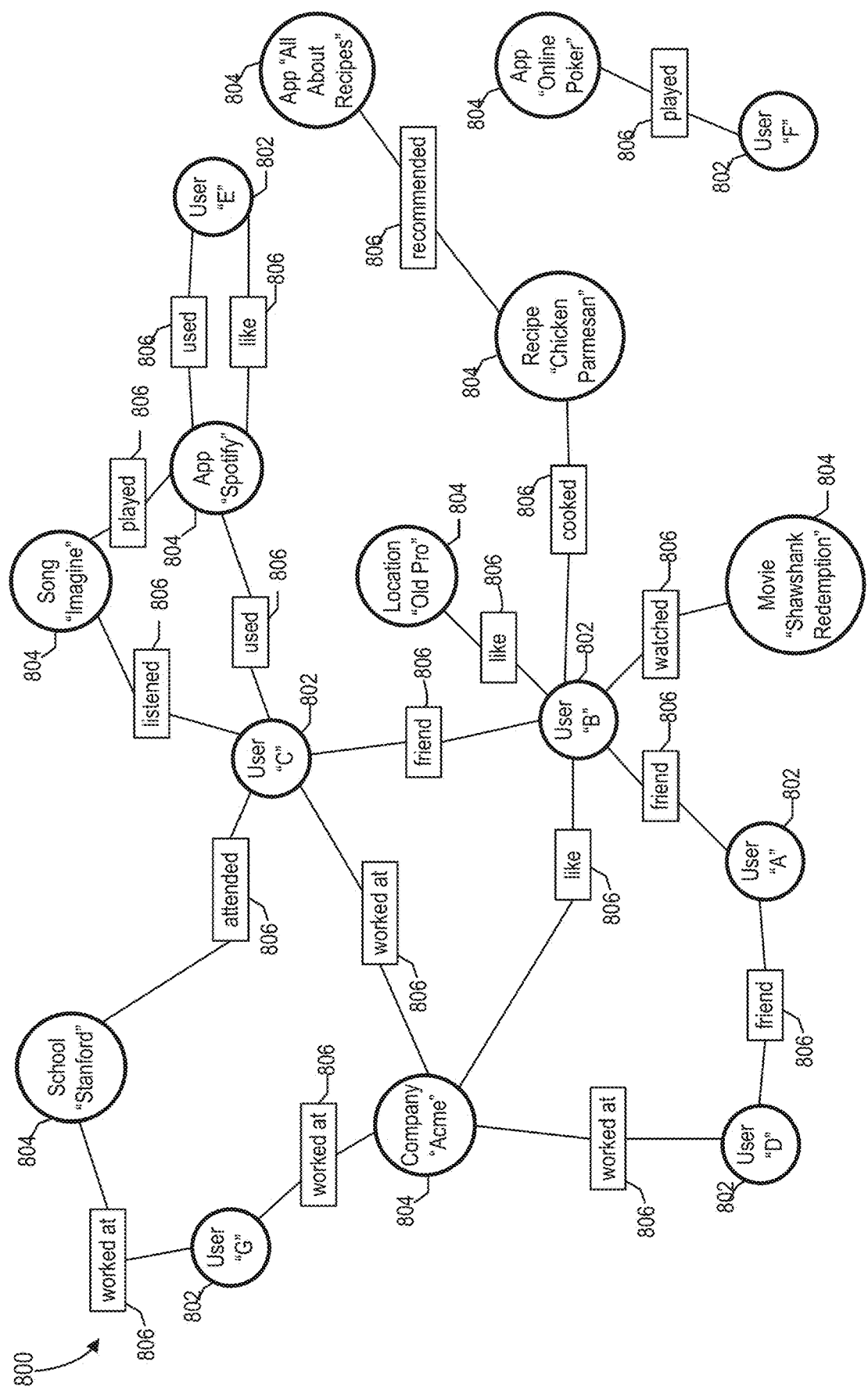
FIG. 8 illustrates a social graph in accordance with one or more embodiments.

FIG. 8 illustrates example social graph 800. In particular embodiments, networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of networking system 702. As an example and not by way of limitation, a user may be an individual (human user), an entity (e.g., an enterprise, business, or third-party application), or a group (e.g., of individuals or entities) that interacts or communicates with or over networking system 702. In particular embodiments, when a user registers for an account with networking system 702, networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with networking system 702. In particular embodiments, a user node 802 may be associated with information provided by a user or information gathered by various systems, including networking system 702. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with networking system 702 or a third-party website associated with a web-application server); an entity (such as, for example, a person, business, group, sports team, or celebrity); a resource (such as, for example, an audio file, video file, digital photo, text file, structured document, or application) which may be located within networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to networking system 702. Profile pages may also be hosted on third-party websites associated with a third-party system 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 706 to send to networking system 702 a message indicating the user's action. In response to the message, networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, networking system 702 may send a "friend request" to the second user. If the second user confirms the "friend request," networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept node 804 by clicking or selecting a "Like" icon, which may cause the user's client device 706 to send to networking system 702 a message indicating the user's liking of the concept associated with the concept-profile page. In response to the message, networking system 702 may create an edge 806 between user node 802 associated with the user and concept node 804, as illustrated by "like" edge 806 between the user and concept node 804. In particular embodiments, networking system 702 may store an edge 806 in one or more data stores. In particular embodiments, an edge 806 may be automatically formed by networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 702) or RSVP (e.g., through networking system 702) to an event associated with the advertisement. In addition or as an alternative, an advertisement may include social-networking-system context directed to the user. As an example and not by way of limitation, an advertisement may display information about a friend of the user within networking system 702 who has taken an action associated with the subject matter of the advertisement.

In particular embodiments, networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 702 may calculate a coefficient based on a user's actions. Networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Networking system 702 may analyze a user's actions to determine whether one or more of the actions indicate an affinity for subject matter, content, other users, and so forth. As an example and not by way of limitation, if a user may make frequently posts content related to "coffee" or variants thereof, networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 702 may calculate a coefficient based on the type of relationship between particular objects. Referencing the social graph 800, networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user node 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 702 may determine that the user has a higher coefficient with respect to the first photo than the second photo because having a tagged-in-type relationship with content may be assigned a higher weight and/or rating than having a like-type relationship with content. In particular embodiments, networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 702 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 706 of the user). A first user may be more interested in other users or concepts that are closer to the first user. As an example and not by way of limitation, if a user is one mile from an airport and two miles from a gas station, networking system 702 may determine that the user has a higher coefficient for the airport than the gas station based on the proximity of the airport to the user.

In particular embodiments, networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 702 may provide information that is relevant to user's interests and current circumstances, increasing the likelihood that they will find such information of interest. In particular embodiments, networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, networking system 702 may calculate the coefficient (or access the coefficient information if it has previously been calculated and stored). In particular embodiments, networking system 702 may measure an affinity with respect to a particular process. Different processes (both internal and external to the online social network) may request a coefficient for a particular object or set of objects. Networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 702 may send a request to the data store for the object. The request may identify the user associated with the request and may only be sent to the user (or a client device 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
providing a sponsored digital content item corresponding to a sponsor for display via a client device of a user;
in response to detecting a user interaction with the sponsored digital content item, generating a screened communication thread between the sponsor and the user at a server by:
adding, to the screened communication thread at the server, an electronic message comprising an indicator of the sponsored digital content item;
providing access to the screened communication thread to the user from the server; and
withholding access to the screened communication thread at the server from the sponsor;
detecting a user interaction with the screened communication thread on the client device of the user; and in response to the detected user interaction with the screened communication thread on the client device of the user, converting the screened communication thread at the server to an open communication thread between the sponsor and the user by providing access to the open communication thread at the server to the sponsor.

2. The method as recited in claim 1, wherein:
providing the sponsored digital content item comprises providing the sponsored digital content item via a networking system newsfeed; and
detecting the user interaction with the sponsored digital content item comprises detecting at least one of the following via the networking system newsfeed: detecting a selection of the sponsored digital content item, detecting a scroll stop corresponding to the sponsored digital content item, or detecting a mouse hover corresponding to the sponsored digital content item.

3. The method as recited in claim 1, wherein detecting the user interaction with the screened communication thread comprises at least one of: detecting the user opening the screened communication thread, detecting the user composing a message associated with the screened communication thread, detecting the user sending a message associated with the screened communication thread, or detecting the user interacting with a digital content item within the screened communication thread.

4. The method as recited in claim 1, further comprising:
determining an activity level associated with the user relative to a messaging application; and
providing access to the screened communication thread to the user by adding the screened communication thread to a listing of communication threads associated with the user in the messaging application based on the determined activity level associated with the user relative to the messaging application.

5. The method as recited in claim 4,
wherein determining the activity level comprises:
determining a first activity level corresponding to the messaging application and a second activity level corresponding to a second messaging application;
comparing the first activity level with the second activity level; and
wherein providing access by adding the screened communication thread is further based on comparing the first activity level with the second activity level.

6. The method as recited in claim 4, further comprising:
determining a threshold amount of time has elapsed since adding the screened communication thread to the listing of communication threads associated with the user without the user interacting with the screened communication thread; and
based on determining that the threshold amount of time has elapsed, providing a reminder associated with the screened communication thread, wherein the reminder comprises one or more of: a repositioning of the screened communication thread within the listing of communication threads or generating a new message within the screened communication thread.

7. The method as recited in claim 1, wherein:
providing the information associated with the user to the sponsor providing access to the screened communication thread to the user further comprises adding a communication thread control associated with the screened communication thread to a sub-listing of sponsored communication threads within a listing of communication threads associated with the user in a messaging application on the client device of the user; and
withholding access to the screened communication from the sponsor further comprises keeping the communication thread control associated with the screened communication thread out of a listing of communication threads associated with sponsor user in a messaging application on a client device of the sponsor.

8. A system comprising:
at least one processor; and
at least on non-transitory computer-readable storage medium storing instructions thereon that, when executed by the at least one processor, cause the system to:
provide a sponsored digital content item corresponding to a sponsor for display via a client device of a user;
in response to detecting a user interaction with the sponsored digital content item, generate a screened communication thread between the sponsor and the user at a server by:
adding, to the screened communication thread at the server, an electronic message comprising an indicator of the sponsored digital content item;
providing access to the screened communication thread to the user from the server; and
withholding access to the screened communication thread at the server from the sponsor;
detect a user interaction with the screened communication thread on the client device and the user; and
in response to the detected user interaction with the screened communication thread on the client device of the user, convert the screened communication thread at the server to an open communication thread between the sponsor and the user by providing access to the open communication thread at the server to the sponsor.

9. The system as recited in claim 8, wherein:
providing the sponsored digital content item comprises providing the sponsored digital content item via a networking system newsfeed; and
detecting the user interaction with the sponsored digital content item comprises detecting at least one of the following via the networking system newsfeed: detecting a selection of the sponsored digital content item, detecting a scroll stop corresponding to the sponsored digital content item, or detecting a mouse hover corresponding to the sponsored digital content item.

10. The system as recited in claim 9, wherein detecting the user interaction with the screened communication thread comprises at least one of: detecting the user opening the screened communication thread, detecting the user composing a message associated with the screened communication thread, detecting the user sending a message associated with the screened communication thread, or detecting the user interacting with a digital content item within the screened communication thread.

11. The system as recited in claim 10, further comprising instructions that, when executed by the at least one processor, cause the system to:
determine an activity level associated with the user relative to a messaging application; and
wherein providing access to the screened communication thread to the user comprises adding the screened communication thread to a listing of communication threads associated with the user in the messaging application based on the determined activity level associated with the user relative to the messaging application.

12. The system as recited in claim 11,
wherein determining the activity level comprises:
determining a first activity level corresponding to the messaging application and a second activity level corresponding to a second messaging application;
comparing the first activity level with the second activity level; and
wherein adding the screened communication thread is further based on comparing the first activity level with the second activity level.

13. The system as recited in claim 12, further comprising instructions that, when executed by the at least one processor, cause the system to:
determine a threshold amount of time has elapsed since adding the screened communication thread to the listing of communication threads associated with the user without the user interacting with the screened communication thread; and
based on determining that the threshold amount of time has elapsed, provide a reminder associated with the screened communication thread, wherein the reminder comprises one or more of: a repositioning of the screened communication thread within the listing of communication threads or generating a new message within the screened communication thread.

14. The system as recited in claim 8, wherein:
providing access to the screened communication thread to the user further comprises adding a communication thread control associated with the screened communication thread to a sub-listing of sponsored communication threads within a listing of communication threads associated with the user in a messaging application on the client device of the user; and
withholding access to the screened communication from the sponsor further comprises keeping the communication thread control associated with the screened communication thread out of a listing of communication threads associated with sponsor user in a messaging application on a client device of the sponsor.

15. A non-transitory computer-readable medium storing instructions thereon that, when executed by at least one processor, cause a computer system to:
provide a sponsored digital content item corresponding to a sponsor for display via a client device of a user;
in response to detecting a user interaction with the sponsored digital content item, generate a screened communication thread between the sponsor and the user at a server by:
adding, to the screened communication thread at the server, an electronic message comprising an indicator of the sponsored digital content item;
providing access to the screened communication thread to the user from the server; and
withholding access to the screened communication thread at the server from the sponsor;
detect a user interaction with the screened communication thread on the client device of the user; and
in response to the detected user interaction with the screened communication thread on the client device of the user, convert the screened communication thread at the server to an open communication thread between the sponsor and the user by providing access to the open communication thread at the server to the sponsor.

16. The non-transitory computer-readable medium as recited in claim 15, wherein:
providing the sponsored digital content item comprises providing the sponsored digital content item via a networking system newsfeed; and
detecting the user interaction with the sponsored digital content item comprises detecting at least one of the following via the networking system newsfeed: detecting a selection of the sponsored digital content item, detecting a scroll stop corresponding to the sponsored digital content item, or detecting a mouse hover corresponding to the sponsored digital content item.

17. The non-transitory computer-readable medium as recited in claim 16, further comprising instructions that, when executed by at least one processor, cause a computer system to:
determine an activity level associated with the user relative to a messaging application by:
determining a first activity level corresponding to the messaging application and a second activity level corresponding to a second messaging application; and
comparing the first activity level with the second activity level; and
wherein providing access to the screened communication thread to the user comprises adding the screened communication thread to a listing of communication threads associated with the user in the messaging application based on the determined activity level associated with the user relative to the messaging application, and wherein adding the screened communication thread is further based on comparing the first activity level with the second activity level.

18. The non-transitory computer-readable medium as recited in claim 17, further comprising instructions that, when executed by at least one processor, cause a computer system to:
determine a threshold amount of time has elapsed since adding the screened communication thread to the listing of communication threads associated with the user without the user interacting with the screened communication thread; and
based on determining that the threshold amount of time has elapsed, provide a reminder associated with the screened communication thread, wherein the reminder comprises one or more of: a repositioning of the screened communication thread within the listing of communication threads or generating a new message within the screened communication thread.

19. The non-transitory computer-readable medium as recited in claim 15, further storing instructions thereon that, when executed by the at least one processor, cause the computing system to:
provide the sponsored digital content item by providing the sponsored digital content item via a networking system newsfeed; and
detect the user interaction with the sponsored digital content item by detecting at least one of the following via the networking system newsfeed: detecting a selection of the sponsored digital content item, detecting a scroll stop corresponding to the sponsored digital content item, or detecting a mouse hover corresponding to the sponsored digital content item.

20. The non-transitory computer-readable medium as recited in claim 15, further storing instructions thereon that, when executed by the at least one processor, cause the computing system to detect the user interaction with the screened communication thread by detecting at least one of:

the user opening the screened communication thread, the user composing a message associated with the screened communication thread, the user sending a message associated with the screened communication thread, or the user interacting with a digital content item within the screened communication thread.

* * * * *